(12) United States Patent
Tsubusaki

(10) Patent No.: US 9,253,410 B2
(45) Date of Patent: Feb. 2, 2016

(54) OBJECT DETECTION APPARATUS, CONTROL METHOD THEREFOR, IMAGE CAPTURING APPARATUS, AND STORAGE MEDIUM

(71) Applicant: CANON KABUSHIKI KAISHA, Tokyo (JP)

(72) Inventor: Akihiro Tsubusaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 3 days.

(21) Appl. No.: 14/219,241

(22) Filed: Mar. 19, 2014

(65) Prior Publication Data
US 2014/0320702 A1    Oct. 30, 2014

(30) Foreign Application Priority Data

Apr. 25, 2013  (JP) ................................. 2013-093046
Jul. 1, 2013   (JP) ................................. 2013-137668
Jul. 1, 2013   (JP) ................................. 2013-138443

(51) Int. Cl.
*H04N 5/232*  (2006.01)

(52) U.S. Cl.
CPC ....... *H04N 5/23296* (2013.01); *H04N 5/23219* (2013.01); *H04N 5/23245* (2013.01); *H04N 5/23293* (2013.01)

(58) Field of Classification Search
CPC ..... G06T 7/004; G06T 7/0042; G06T 7/0044; G06T 7/0046; G06T 7/0048; G08B 13/19608; G03B 2205/0046; H04N 5/3454; H04N 5/3456; H04N 3/1562
See application file for complete search history.

(56) References Cited

U.S. PATENT DOCUMENTS

| 2006/0077262 | A1* | 4/2006 | Miyamaki et al. ........ 348/211.99 |
| 2012/0062692 | A1* | 3/2012 | Tsubusaki et al. .............. 348/36 |
| 2012/0062769 | A1* | 3/2012 | Kinoshita et al. .......... 348/240.2 |
| 2012/0105647 | A1* | 5/2012 | Yoshizumi .................... 348/169 |
| 2013/0027510 | A1* | 1/2013 | Tsubusaki ....................... 348/36 |

FOREIGN PATENT DOCUMENTS

| JP | 6005912 B   | 1/1994 |
| JP | 2012-060595 A | 3/2012 |

OTHER PUBLICATIONS

Translation of Japanese Publication No. 2009-033450, Feb. 2009, Yanagi.*

* cited by examiner

*Primary Examiner* — Nicholas Giles
(74) *Attorney, Agent, or Firm* — Cowan, Liebowitz & Latman, P.C.

(57) ABSTRACT

An apparatus includes a first operation unit configured to instruct to change an angle of view, an object detection unit configured to detect an object from an image, and a control unit configured to control the angle of view. In response to a first operation via the first operation unit, the control unit executes a first mode. In the first mode, if the object is detected in a first area set within the image, the control unit changes the angle of view to a first angle of view, and sets the angle of view before the change as a second angle of view, and if, at the first angle of view, the object is detected in a second area, the control unit changes the angle of view to the second angle of view.

24 Claims, 13 Drawing Sheets

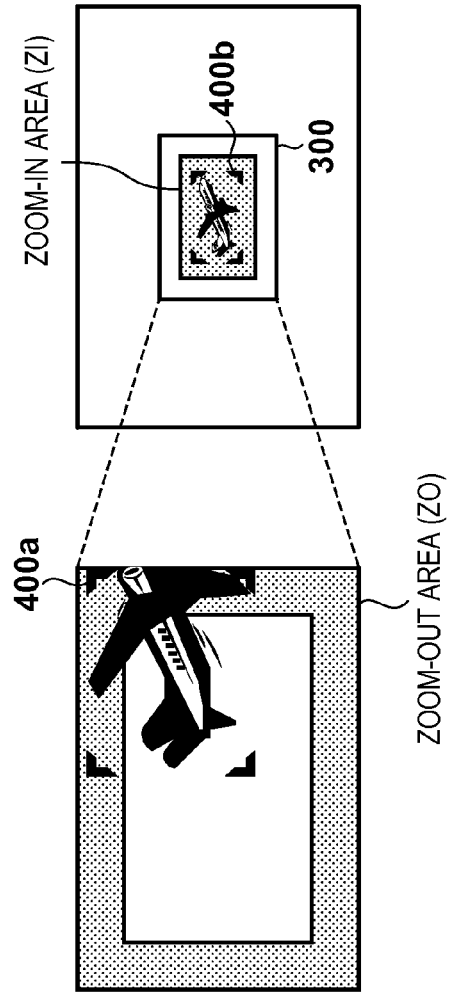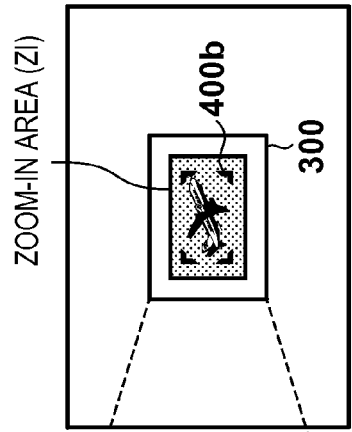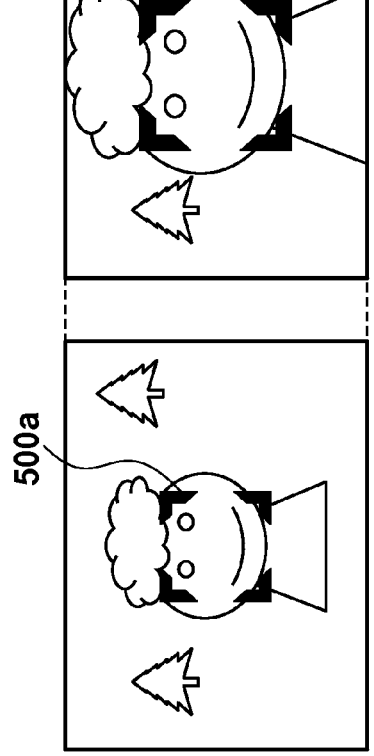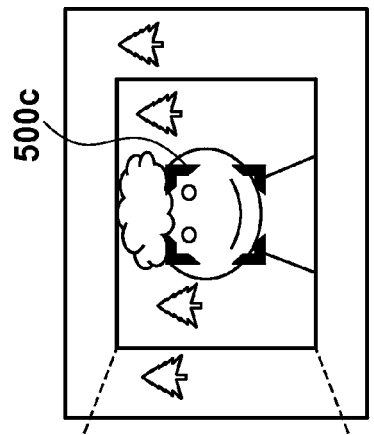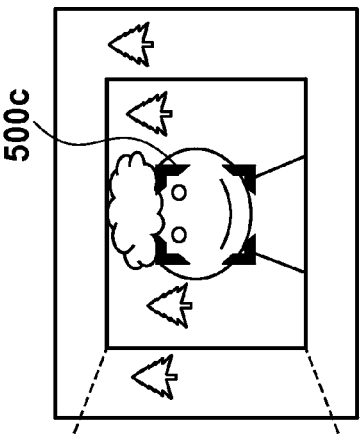

OBJECT DETECTION APPARATUS, CONTROL METHOD THEREFOR, IMAGE CAPTURING APPARATUS, AND STORAGE MEDIUM

BACKGROUND OF THE INVENTION

1. Field of the Invention

The present invention relates to an object detection apparatus having a zoom function, and a control method for the object detection apparatus.

2. Description of the Related Art

Some image capturing apparatuses such as digital cameras have an optical zoom function of driving a zoom lens and an electronic zoom function of enlarging part of a captured area. In recent years, it has become possible to perform shooting from super-wide angle to super-telephoto with a single lens thanks to improvement in performance of a zoom lens, and to obtain an image having a sufficiently high resolution even at a high enlargement magnification thanks to an increase in number of pixels of an image sensor.

Japanese Patent Laid-Open No. 2012-60595 proposes a function called a framing assist zoom function (FA zoom function) as a function of immediately capturing an object again when the object moves out of a frame. When the start of the FA zoom function is instructed, an apparatus disclosed in Japanese Patent Laid-Open No. 2012-60595 can zoom out to move the zoom position in the wide angle direction. When the end of the FA zoom function is instructed, the apparatus can zoom in to the zoom position when the start of the FA zoom function was instructed.

On the other hand, there is known a so-called auto zoom function as a function in which a camera detects an object within a screen, and automatically changes a zoom position in accordance with object detection information. Japanese Patent Publication No. 6-5912 (Japanese Patent No. 2052653) discloses a method of zooming out to move the zoom position in the wide angle direction when an object reaches the limit position of a specific area within a screen. Japanese Patent Publication No. 6-5912 also proposes a method of zooming in to move the zoom position in the telephoto direction when an object stays in the central portion of the screen.

According to Japanese Patent Publication No. 6-5912, however, depending on the moving speed of an object to be captured, zoom operation start conditions, a zoom change amount, and the like, the auto zoom function may immediately zoom in based on the position of the object when the object moves close to the center of the screen in a zoom-out operation, and may immediately zoom out based on the position of the object when the object moves close to the peripheral portion of the screen in a zoom-in operation. That is, a hunting phenomenon may unwantedly occur in which a zoom-out operation and a zoom-in operation are repeated. As a result, a photographer may be annoyed, or may miss a shutter chance due to the operation.

The above-described FA zoom function performs a zoom-out operation or zoom-in operation in accordance with an operation by the photographer. To improve the convenience of the photographer, the FA zoom function is assumed to automatically perform a zoom operation in accordance with the state of the object. In this case, it is required to suppress the above-described hunting phenomenon in order to quickly adjust an angle of view.

SUMMARY OF THE INVENTION

The present invention has been made in consideration of the above problem, and prevents a hunting phenomenon, in which a zoom-out operation and a zoom-in operation are repeated, from occurring in an operation of capturing an object again when the object moves outside an angle of view in telephoto shooting.

According to the first aspect of the present invention, there is provided an object detection apparatus including a first operation unit configured to instruct to change an angle of view by a user, an object detection unit configured to detect an object from an image, and a control unit configured to control the angle of view in accordance with an operation of the first operation unit, wherein in response to a first operation via the first operation unit, the control unit executes a first mode, and in the first mode, if the object is detected by the object detection unit in a first area set within the image, the control unit changes the angle of view to a first angle of view on a wide angle-side, and sets the angle of view before the change as a second angle of view, and if, at the first angle of view, the object is detected by the object detection unit in a second area set within an area corresponding to the second angle of view, the control unit changes the angle of view to the second angle of view.

According to the second aspect of the present invention, there is provided a method of controlling an object detection apparatus including a first operation unit configured to instruct to change an angle of view by a user, comprising: a detection step of detecting an object from an image; and a control step of controlling the angle of view in accordance with an operation of the first operation unit, wherein in response to a first operation via the first operation unit, a first mode is executed in the control step, and in the first mode, if the object is detected in the detection step in a first area set within the image, the angle of view is changed to a first angle of view on a wide angle-side and the angle of view before the change is set as a second angle of view, and if, at the first angle of view, the object is detected in the detection step in a second area set within an area corresponding to the second angle of view, the angle of view is changed to the second angle of view.

Further features of the present invention will become apparent from the following description of exemplary embodiments with reference to the attached drawings.

BRIEF DESCRIPTION OF THE DRAWINGS

FIGS. 4A and 4B are views for explaining processing of preventing an object (article) from moving out of a screen;

FIGS. 5A to 5C are views for explaining processing of preventing an object (person) from changing in size on the screen;

DESCRIPTION OF THE EMBODIMENTS

An embodiment of the present invention will be described in detail below with reference to the accompanying drawings. Note that a function implemented by the embodiment is a framing support zoom function of supporting framing by the photographer, which will be referred to as a farming assist zoom function (to be simply referred to as an FA zoom function hereinafter) for the sake of convenience.

Figure 1:
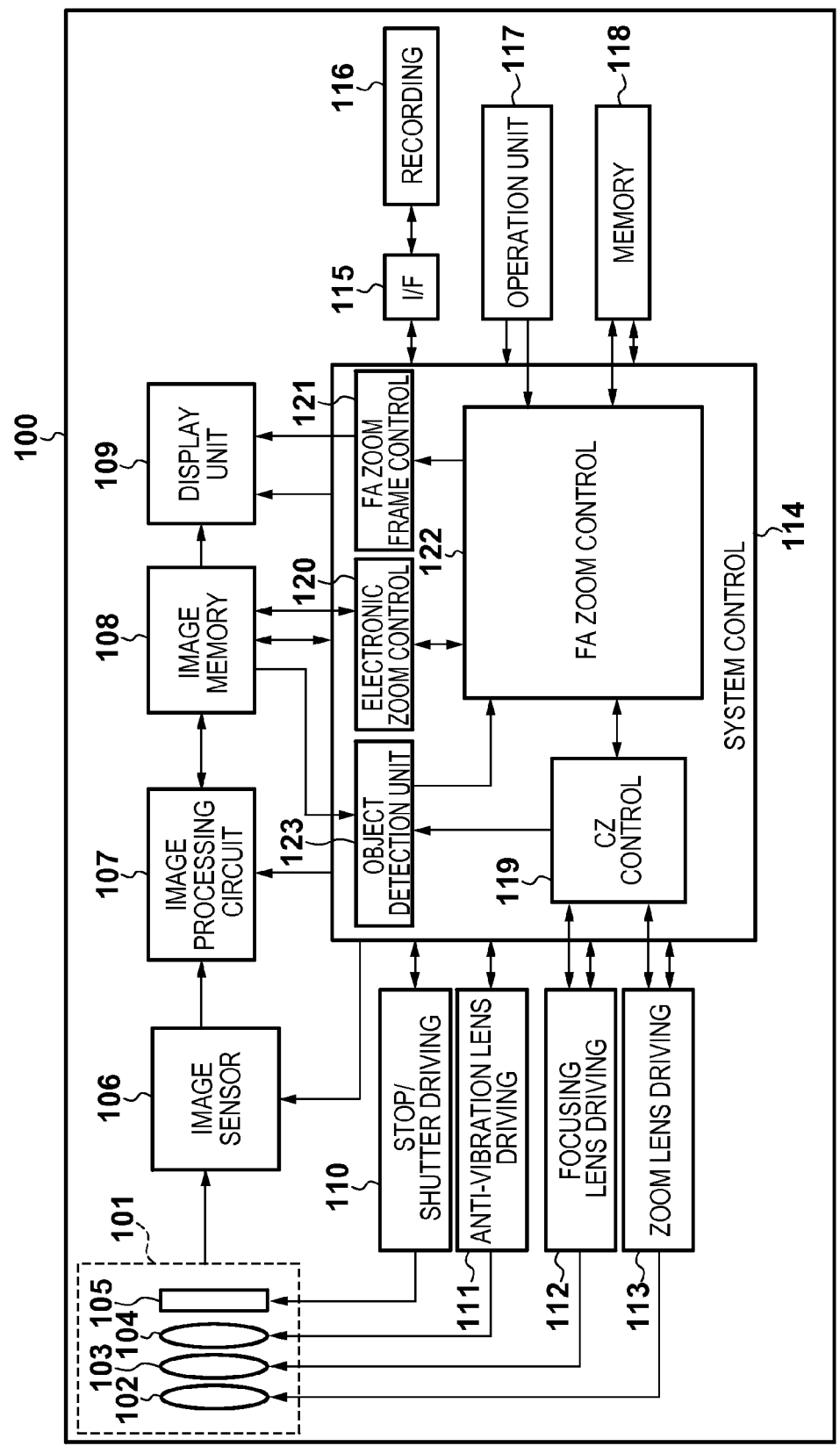
FIG. 1 is a block diagram showing an example of the arrangement of a digital camera according to an embodiment of the present invention.

FIG. 1 is a block diagram showing the arrangement of a digital camera 100 as an embodiment of an image capturing apparatus according to the present invention. A lens barrel 101 includes a lens group. A zoom lens 102 adjusts its focal length by moving in the optical axis direction, thereby optically changing an angle of view (changing a zoom position). A focusing lens 103 adjusts focus by moving in the optical axis direction. An anti-vibration lens 104 is a correction lens for correcting image blurring due to a camera shake. A stop/shutter 105 for adjusting the amount of light is used for exposure control. Light having passed through the lens barrel 101 is received by an image sensor 106 which uses a CCD (Charge Coupled Device), a CMOS (Complementary Metal Oxide Semiconductor), or the like, and photoelectrically converted to generate an image capturing signal. The image capturing signal is input to an image processing circuit 107, undergoes pixel interpolation processing, color conversion processing, and the like, and is then sent to an image memory 108 as image data. The image memory 108 is formed from a DRAM (Dynamic Random Access Memory), an SRAM (Static Random Access Memory), or the like.

A display unit 109 serving as a display means is formed from a TFT-LCD (a liquid crystal display driven by a thin film transistor) or the like, and displays specific information (for example, shooting information and an FA zoom frame (to be described later)) together with the captured image data. Displaying information such as a live view realizes an electronic viewfinder (EVF) function used by the photographer to adjust the angle of view.

A stop/shutter driving unit 110 calculates exposure control values (an f-number and shutter speed) based on luminance information obtained by the image processing in the image processing circuit 107, and drives the stop/shutter 105 based on the calculation result. This performs automatic exposure (AE) control. An anti-vibration lens driving unit 111 calculates the amount of a shake applied to the digital camera 100 based on information of an angular velocity sensor such as a gyro sensor, and drives the anti-vibration lens 104 to cancel the shake.

A focusing lens driving unit 112 drives the focusing lens 103. For example, under the control of a contrast AF (Auto Focus) system, based on the focus adjustment information (contrast evaluation value) of an imaging optical system, which has been obtained by the image processing in the image processing circuit 107, the focusing lens 103 is driven so that an object is in focus. Note that since this embodiment is applicable irrespective of whether focus adjustment control is performed, a combination of a phase difference AF system and another system can be adopted. A zoom lens driving unit 113 drives the zoom lens 102 in accordance with a zoom operation instruction. An operation unit 117 includes a zoom lever, a zoom button, or the like serving as a zoom operation member used by the photographer to instruct the camera to perform zooming. A system control unit 114 calculates a zoom driving speed and driving direction based on the operation amount and operation direction of the zoom operation member (a second operation unit) used for a zoom instruction operation, and the zoom lens 102 moves along the optical axis in accordance with the calculation result.

Image data generated by a shooting operation is sent to a recording unit 116 via an interface unit (to be referred to as an I/F unit hereinafter) 115, and recorded in the recording unit 116. The image data is recorded in one or both of an external recording medium such as a memory card which is inserted to the camera and then used, and a nonvolatile memory 118 incorporated in the digital camera 100.

In addition to the above-described zoom operation member, the operation unit 117 includes a release switch for instructing the start of shooting, and an FA zoom operation switch (a first operation unit) for instructing the start or end of the FA zoom function. An operation signal is sent to the system control unit 114 (to be described later). The memory 118 stores the setting information of the digital camera 100 and information such as a zoom-in position in the FA zoom function (to be described later) as well as program data and image data. Note that the zoom-in position indicates a target return position when performing a zoom-in operation upon completion of an FA zoom operation, and a detailed description thereof will be provided later.

The system control unit 114 serving as a control means is formed by using an arithmetic unit such as a CPU (Central Processing Unit), and controls the overall camera by sending a control instruction to each unit in accordance with an operation by the photographer. The system control unit 114 executes various control programs stored in the memory 118, for example, programs for control of the image sensor 106, AE/AF control, zoom control (including FA zoom processing), and the like.

A control operation associated with the FA zoom function by the system control unit 114 will be described next. Note that in FIG. 1, internal processes of the system control unit 114 are represented by functional blocks 119 to 123.

Figure 2:
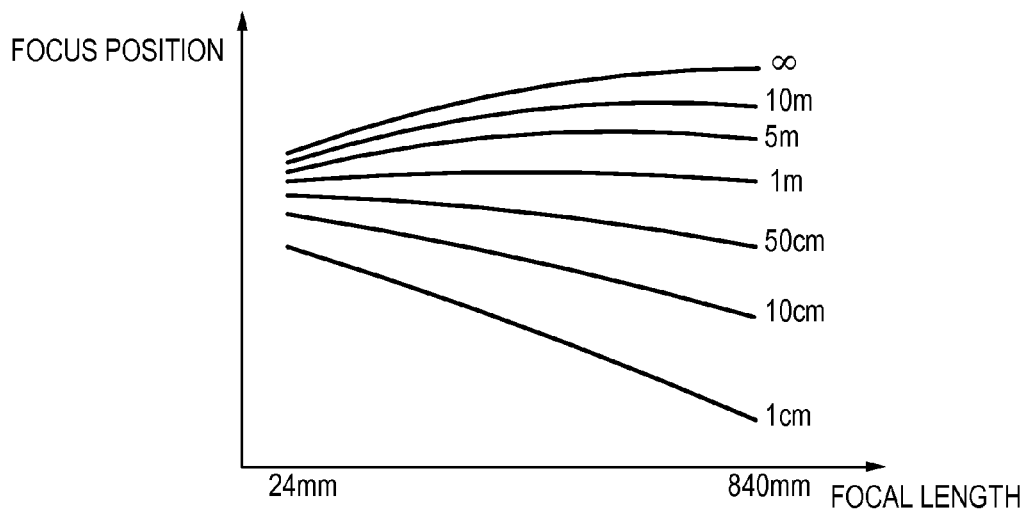
FIG. 2 is a graph showing the relationship between a focal length and a focusing lens position for each object distance.

To maintain an in-focus state even when changing an angle of view by optical zooming, in the case of a rear-focus type barrel represented as the lens barrel 101, it is necessary to move the focusing lens 103 to a correct focus position in accordance with the position of the zoom lens 102. Such control is called computer zoom (CZ) control. FIG. 2 is a graph obtained from a data table and showing, for each distance to the object, the relationship between the focal length of the zoom lens and a focus position in an in-focus state. This table will be referred to as a focus cam table. The abscissa represents a focal length corresponding to a zoom position, and the ordinate represents a focus position. The distance (object distance) from the camera to the object is indicated for each line. The system control unit 114 performs a scan operation in an AF operation by controlling the focusing lens driving unit 112 to move the focusing lens 103 within a predetermined range. Using a contrast evaluation value and the like obtained in this operation, a focus position as an in-focus point is detected by a known method. It is possible to measure the object distance by referring to the focus cam table based on the focus position and the zoom position at this time.

The digital camera 100 has an optical zoom function and an electronic zoom function. The CZ control unit 119 and the zoom lens driving unit 113 serve to drive optical zooming. In a zoom operation, the CZ control unit 119 detects the zoom position of the zoom lens 102 every predetermined control period, and drives the focusing lens 103 to follow the focus cam table in accordance with the detected zoom position. This makes it possible to perform an optical zoom operation while maintaining the in-focus state.

On the other hand, the electronic zoom control unit 120 and image memory 108 serve to drive electronic zooming. The electronic zoom control unit 120 implements the electronic zoom function by extracting a target area from the image data transferred to the image memory 108. Furthermore, smooth electronic zoom display is realized by gradually increasing an extraction range to display it on the display unit 109 every frame rate period of a video captured by the image sensor 106.

The object detection unit 123 detects a desired object area from the image data (within an image area) in the image memory 108. In this embodiment, an object detection method of detecting an object based on face information and color information will be explained. Face detection processing is processing of detecting a face area existing in the image data by a known algorithm. For example, the object detection unit 123 extracts a feature amount from a square partial area on the image data, and compares the extracted feature amount with a face feature amount prepared in advance. If the correlation value between the feature amounts exceeds a given threshold, the object detection unit 123 determines the partial area as a face area. By repeating this determination processing while changing a combination of the size of a partial area, an arrangement position, and an arrangement angle, various face areas existing in the image data are detected. In color detection processing, color information of an object area designated according to an object designation method (to be described later) is stored as a feature color. The color detection processing is executed when an object to be detected is an "article" other than a person. As the color information, RGB as an output signal from the image processing circuit 107, a luminance Y, color differences R-Y and B-Y, and the like are used. Upon detecting an object, the image data is divided into several partial areas, and the averages of the color differences and the luminances are calculated for each partial area. Furthermore, color information of each area upon detecting an object is compared with feature color information stored in advance, and a partial area having a luminance difference and color difference respectively equal to or smaller than predetermined amounts is set as a candidate object area. A group of adjacent partial areas of the candidate areas is set as an isochromatic area, and an isochromatic area having a size within a predetermined size range is set as a final object area.

The object detection unit 123 can estimate the size of the object area on the image data by using the object distance information measured by the CZ control unit 119 and the focal length information of the zoom lens 102 together with the face information and the color information.

An overview of the FA zoom function, and the FA zoom frame control unit 121 and FA zoom control unit 122 will be described next. The FA zoom function according to this embodiment has two modes, that is, a manual search mode and an automatic tracking mode. The difference between the two modes is as follows. That is, in the manual search mode, the object is captured again by operating the FA zoom operation switch by the photographer when the object moves out of the screen. In the automatic tracking mode, the camera automatically detects the object to support adjustment of the angle of view. An overview of the function of each mode will be explained.

For a camera without the FA zoom function, when the object moves out of the screen while the photographer waits for a shutter chance after performing framing in a telephoto state, the photographer (user) needs to perform the following operations:

(1) an operation of searching for the object by performing a zoom-out operation (zooming on the wide angle-side) by operating the zoom operation member; and (2) an operation of adjusting the angle of view by performing a zoom operation (a zoom operation on the telephoto-side) until a desired angle of view (for example, the angle of view before the zoom motion by the zoom-out operation) is obtained again.

To the contrary, in the case of the digital camera 100 incorporating the manual search mode (second mode) of the FA zoom function, if the photographer loses the track of the object in a state (to be referred to as a shooting preparation state hereinafter) in which angle-of-view adjustment and the like are performed before shooting, he/she need only operate the FA zoom operation switch. The FA zoom operation switch is a switch assigned for the FA zoom function, and is formed from a member different from the zoom operation member. Upon pressing of the FA zoom operation switch, the camera is instructed to start the FA zoom function. In response to the FA zoom start instruction from the FA zoom operation switch, the FA zoom control unit 122 stores a zoom position (zoom-in position) by electronic zooming and that by optical zooming in the memory 118. Furthermore, according to the processing procedure shown in FIG. 6 (to be described later), the FA zoom control unit 122 instructs the CZ control unit 119 or the electronic zoom control unit 120 to zoom out in the wide angle direction, thereby setting a state (to be referred to as an object search state hereinafter) in which the angle of view is wider than that in the shooting preparation state.

Figure 3A:
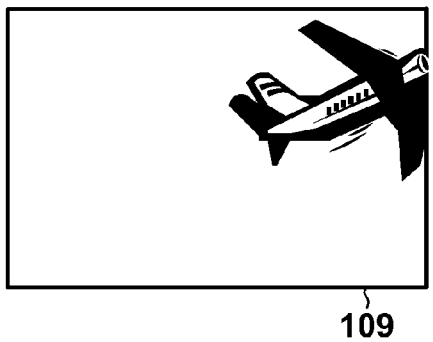
FIGS. 3A to 3D are views exemplifying an angle of view in an object search state and that in a shooting preparation state.
Figure 3B:
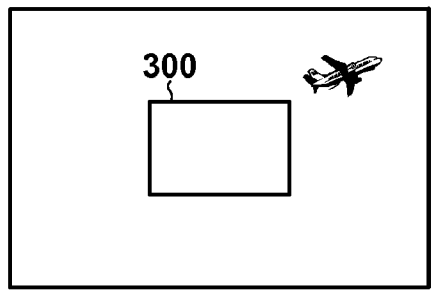
Figure 3C:
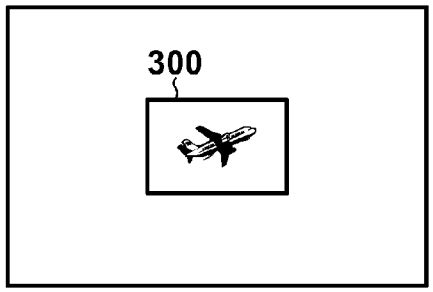
Figure 3D:
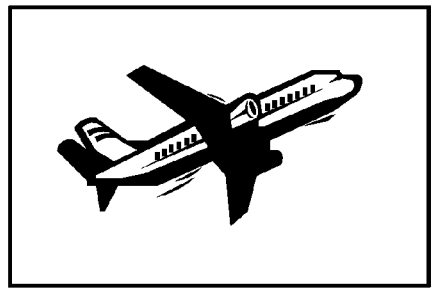

FIGS. 3A and 3D each show an angle of view in a zoom-in state. FIGS. 3B and 3C each show an angle of view in a zoom-out state. When the object moves out of the screen (FIG. 3A), the photographer presses the FA zoom operation switch to search for the object. While the FA zoom operation switch is pressed, the zoom-out state is maintained and an FA zoom frame 300 indicating a zoom-in position is superimposed on the image and displayed on the display unit 109. When the desired object is found in the object search state (FIG. 3B), framing is performed using the FA zoom frame 300 as an index so that the object falls within the FA zoom frame (the peripheral portion of the frame) (FIG. 3C). After that, when the photographer releases the FA zoom operation switch to instruct the camera to end the FA zoom operation, the FA zoom control unit 122 performs a zoom-in operation by electronic zooming or optical zooming to the stored zoom position (zoom-in position) in the shooting preparation state. In this way, an optimum framing state shown in FIG. 3D is obtained.

As shown in FIGS. 3B and 3C, the FA zoom frame control unit 121 calculates a size indicating the stored angle of view in the shooting preparation state, and displays the FA zoom frame 300 in the central portion of the EVF of the display unit 109. The size of the FA zoom frame 300 is calculated based on a zoom magnification in a zoom-out state (before the start of a zoom-out operation). If, for example, the state transits from the shooting preparation state to the object search state by zooming out with an electronic zoom magnification of 2× and an optical zoom magnification of 3×, the FA zoom frame with a size corresponding to $(1/2) \times (1/3) = 1/6$ the angle of view displayed on the EVF in the object search state is displayed. This processing allows the photographer to perform shooting at a desired angle of view while making the object, which has moved out of the screen, fall within the screen again with a simple operation.

On the other hand, when shooting a scene in which an object tends to move out of the screen, for example, when shooting a moving object, it is possible to more easily prevent the object from moving out of the screen by causing the camera to automatically change a zoom position, as will be described below.

The digital camera 100 according to this embodiment has the automatic tracking mode (first mode) of the FA zoom function. In the automatic tracking mode, after setting the mode to the automatic tracking mode, an object to be shot is designated by performing an operation of designating the object through a touch panel or the like. Instead of the method of designating an object by operating the touch panel, a method of designating an object which exists near the central position when a specific button is pressed or a method of automatically selecting a main object from objects detected by the camera can be used as an object designation method. The object detection unit 123 calculates the position and size, on the image data, of the object area designated from the image memory 108. It is possible to track the movement of the object by continuously performing the calculation operation for each sampling of the image data to be displayed as a live view. When the object being tracked is detected in a zoom-out area (to be described later) or when the object becomes larger than a predetermined size (FIG. 3A), the camera instructs the CZ control unit 119 or the electronic zoom control unit 120 to perform a zoom-out operation in the wide angle direction (FIG. 3B). When the object is detected in the zoom-in area of the FA zoom frame 300 and falls within a predetermined size range (FIG. 3C), a zoom-in operation is performed to the zoom position indicated by the FA zoom frame 300 (FIG. 3D). With this processing, the photographer need only move the camera so that the object falls within the screen without considering a zoom operation and, even if the object is about to move out of the screen, the zoom position is automatically changed, thereby allowing simpler angle-of-view adjustment. The embodiment has as its object to enable the photographer to readily perform framing by performing a zoom-out operation and a zoom-in operation in the automatic tracking mode at optimum timings.

The conditions under which a zoom-out operation or a zoom-in operation starts will be described with reference to FIGS. 4A, 4B, and 5A to 5C. Reference numeral 400 denotes an article tracking frame for tracking an article other than a person; and 500, a face tracking frame for tracking a person's face. In this embodiment, if the object can be a person or article, the article tracking frame 400 and the face tracking frame 500 may be collectively referred to as an object tracking frame hereinafter. The object tracking frame is displayed to surround the object on the EVF of the display unit 109 so that the photographer can visually perceive the designated object. The position and size of the object tracking frame on the screen (within the image) are calculated by the object detection unit 123 based on face information and color information, and updated every frame rate period. FIGS. 4A and 4B show a case in which an airplane as an object is prevented from moving out of the screen. FIG. 4A shows, as a zoom-out area (ZO), an area outside a portion whose ratio to the entire angle of view displayed on the EVF is equal to a predetermined one (an area except for the first area). If, for example, 0% is set for the central point of the screen, 100% is set for the entire screen, and a position where the ratio to the entire screen is 80% is set as the boundary of the area ZO, an area of 80% to 100% is set as the area ZO. When part of an article tracking frame 400a enters this area, the camera starts a zoom-out operation. It is possible to prevent the object from moving out of the screen by calculating, based on the size and moving speed of the object, a zoom magnification and zoom speed at which a zoom-out operation is performed, and performs a zoom-out operation at the calculated magnification and speed. FIG. 4B shows, as a zoom-in area (ZI), an area (second area) inside a portion whose ratio to the zoom-in angle of view (a second zoom position) indicated by the FA zoom frame 300 is equal to a predetermined one in the object search state (a first zoom position). If, for example, 0% is set for the central point of the screen, 100% is set for the zoom-in angle of view indicated by the FA zoom frame 300, and a position where a ratio to the zoom-in angle of view is 70% is set as the boundary of the area ZI, an area of 0 to 70% is set as the area ZI. In this case, if the zoom-out magnification is, for example, ½×, the size of the FA zoom frame 300 is equal to 50% of the size of the entire screen. The area ZI can also be regarded as an area of 0 to 35% (=70%×(½)) of the entire screen. When the photographer changes the orientation of the camera so that the article tracking frame 400b falls within the area ZI, the camera starts a zoom-in operation.

The relationship between the lower limit ratio (in the above example, 80%) of the area ZO and the upper limit ratio (in the above example, 70%) of the area ZI will now be described. Consider a case in which a zoom-out operation is performed upon detection of the article tracking frame 400 at the boundary of the area ZO corresponding to the lower limit ratio in the shooting preparation state, the object stops at the detection position, and the orientation of the camera itself is not changed. In this case, if the ZO lower limit ratio and the ZI upper limit ratio are set to the same ratio, the almost entire article tracking frame 400 falls within the area ZI immediately after the zoom-out operation (after the zoom-out operation stops). Alternatively, if settings are made to satisfy "ZO lower limit ratio≤ZI upper limit ratio", the entire article tracking frame 400 falls within the area ZI immediately after the zoom-out operation, and a zoom-in operation unwantedly, immediately starts. That is, a hunting phenomenon unwantedly occurs in which a zoom-out operation and a zoom-in operation are repeated. Therefore, to prevent a hunting phenomenon, it is necessary to make settings so that the relationship between the ZO lower limit ratio and the ZI upper limit ratio satisfies "ZO lower limit ratio>ZI upper limit ratio".

FIGS. 5A to 5C show a case in which when a person as an object moves closer to the camera, the camera automatically performs a zoom operation so that the ratio of the object becomes lower than a predetermined ratio. The face tracking frame 500 is displayed to surround a face area as the feature area of the person as an object. Assume that the size of the face tracking frame 500 is equal to the object size. FIG. 5A shows an angle of view when an object is designated by an object designation method (to be described later). The size of a face tracking frame 500a upon designation of the object is stored in the memory 118 as a reference object size (reference size). FIG. 5B shows an angle of view when the object moves closer to the camera, without changing the zoom position in the state shown in FIG. 5A. For example, a size corresponding to 150% of the size of the face tracking frame 500a as the reference object size (a size equal to or larger than a predetermined multiple of the reference size) is set as a zoom-out start size. When the relationship between the object tracking frames satisfies "face tracking frame 500b>face tracking frame 500a×150%", the camera starts a zoom-out operation. FIG. 5C shows an angle of view when a zoom-out operation is performed in the wide angle direction at a zoom magnification of 1/1.5× corresponding to the change amount between the object size shown in FIG. 5A and that shown in FIG. 5B. If the object further moves closer to the camera thereafter, it is possible to continuously set the ratio of the object to be equal to or lower than the predetermined ratio by repeating a zoom-out operation until the optical zoom position reaches the wide angle end, and the photographer can concentrate on the operation of a release switch. Although the processing of preventing an object from moving out of the screen when the object is an article, and the processing of setting the ratio of an object to be equal to or lower than a predetermined ratio when the object is a person have been described with reference to FIGS. 4A, 4B, and 5A to 5C, any combination of an object to be tracked and zoom operation start determination processing may be possible.

Figure 6:
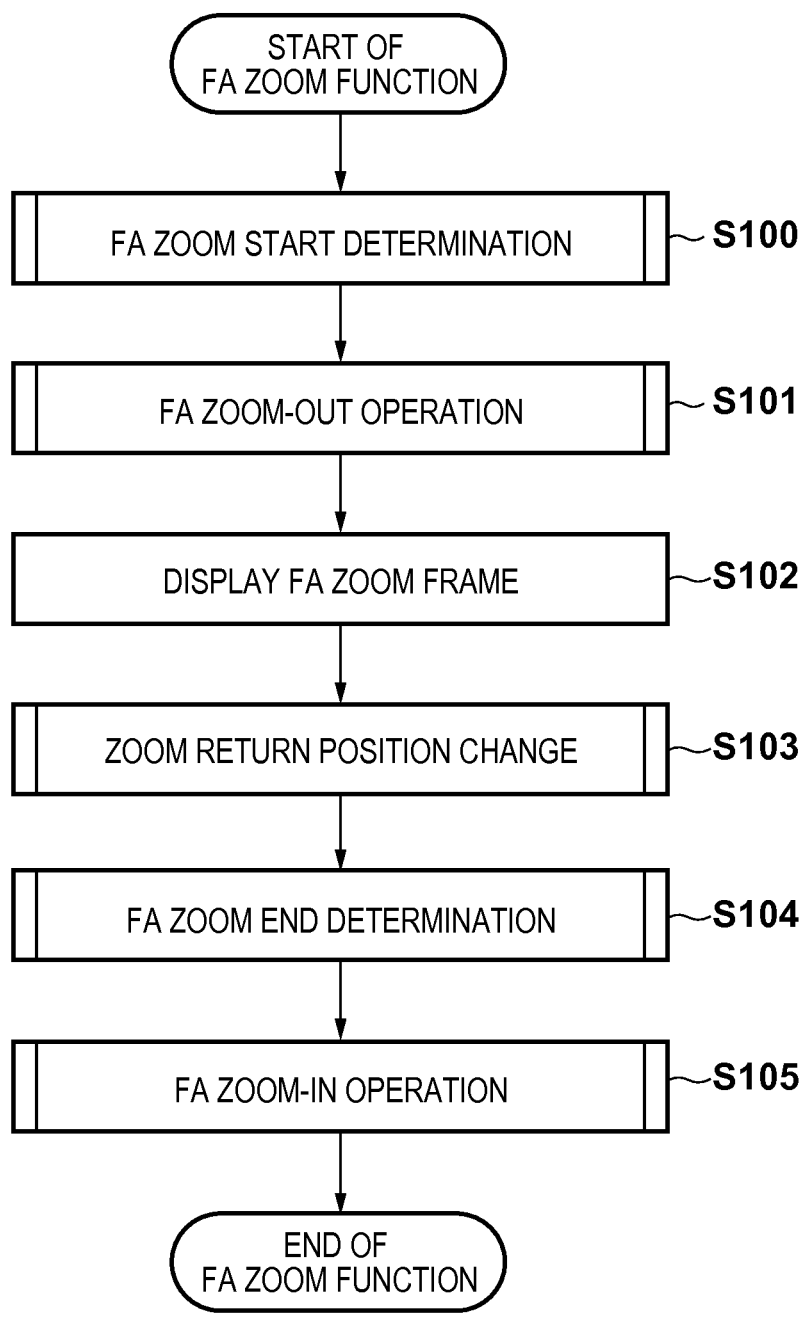
FIG. 6 is a flowchart for explaining an overview of the processing procedure of an FA zoom function.

An overview of the processing of the FA zoom function will be described with reference to FIG. 6. FIG. 6 is a flowchart illustrating a rough processing procedure of the FA zoom function. In step S100, the FA zoom control unit 122 determines whether to start an FA zoom operation. In the FA zoom start determination processing, whether the mode is the manual search mode or the automatic tracking mode is determined. If the mode is the manual search mode, whether to start an FA zoom operation is determined based on the state of the FA zoom operation switch of the operation unit 117. Alternatively, if the mode is the automatic tracking mode, whether to start an FA zoom operation is determined based on an object detection result. A mode determination method will be described later. If the start of an FA zoom operation is determined in the FA zoom start determination processing in step S100, the process advances to step S101.

In step S101, the FA zoom control unit 122 stores an optical zoom position and an electronic zoom position upon start of a zoom-out operation, and also instructs the CZ control unit 119 or the electronic zoom control unit 120 to perform an FA zoom-out operation by a predetermined driving amount. Upon completion of the FA zoom-out operation, the process advances to step S102, and the FA zoom frame control unit 121 displays the FA zoom frame 300 indicating the stored zoom position on the display unit 109. Using the FA zoom frame 300 as an index, the photographer performs a framing operation so that an object to be captured is set near the center of the screen. At this time, if the object falls outside the FA zoom frame 300 or the object is too small, the size of the FA zoom frame 300 is changed to an appropriate one and information of the stored zoom positions is updated in step S103. In step S104, the FA zoom control unit 122 determines whether to end the FA zoom operation.

If the mode upon start of the FA zoom operation is the manual search mode, whether to end the FA zoom operation is determined based on the state of the FA zoom operation switch of the operation unit 117. Alternatively, if the mode is the automatic tracking mode, whether to end the FA zoom operation is determined based on an object detection result. If the end of the FA zoom operation is determined in the FA zoom end determination processing in step S104, the process advances to step S105. In step S105, the FA zoom control unit 122 instructs the CZ control unit 119 or the electronic zoom control unit 120 to perform an FA zoom-in operation so as to perform driving to the stored optical zoom position and electronic zoom position, thereby terminating the FA zoom function.

Each process will be described in detail with reference to FIGS. 7A to 11 in accordance with the processing procedure of the FA zoom function shown in FIG. 6.

Figure 7A:
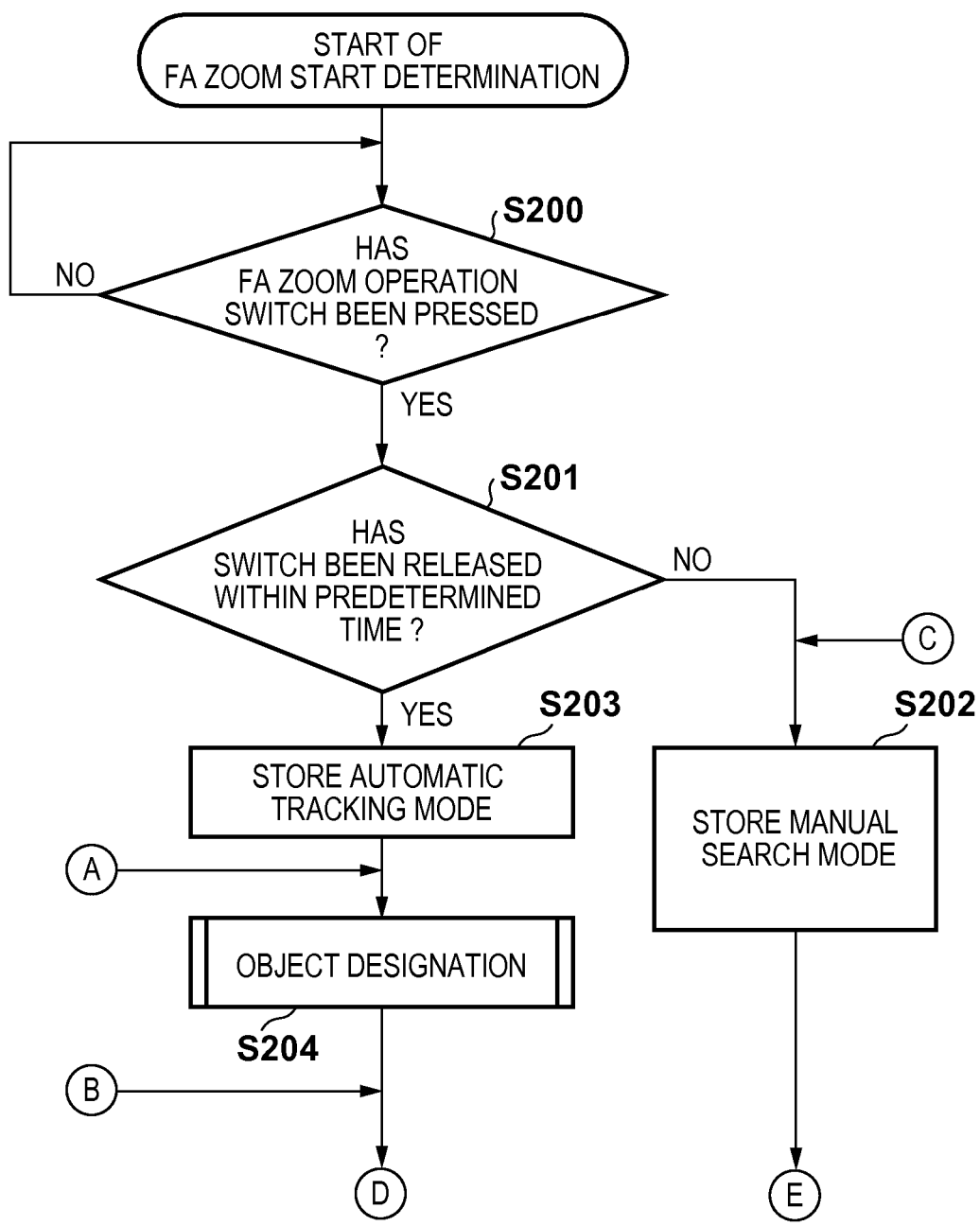
FIGS. 7A and 7B are flowcharts for explaining FA zoom start determination processing.
Figure 7B:
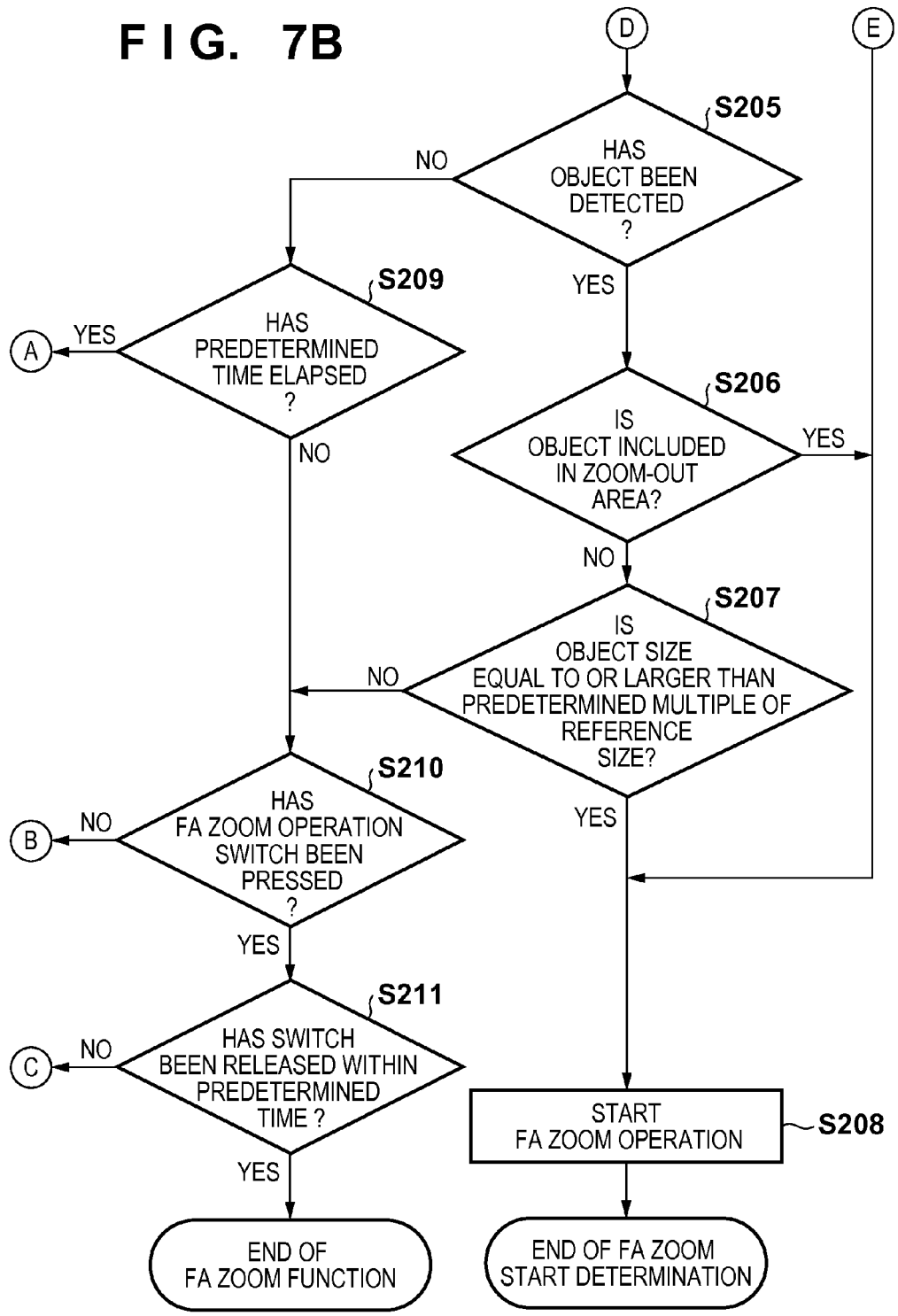

FIGS. 7A and 7B are flowcharts for explaining the FA zoom start determination processing in step S100. In step S200, the FA zoom control unit 122 determines whether the FA zoom operation switch of the operation unit 117 has been pressed. When the FA zoom operation switch is pressed, the process advances to step S201, and the pressing time (operation time) of the switch is measured. In step S201, it is determined whether the FA zoom operation switch has been released within a predetermined time after the start of pressing of the switch. That is, it is determined whether the switch has been pressed for a long time or a short time, and a mode to be executed is changed depending on the pressing time. If the switch has been pressed for a long time (a second operation), the process advances to step S202, and the mode is set to the manual search mode. On the other hand, if the switch has been pressed for a short time (a first operation), the process advances to step S203, and the mode is set to the automatic tracking mode. The selected mode is then stored in the memory 118. In the manual search mode, when a predetermined time elapses after the start of pressing of the switch while the switch is kept pressed, that is, when a long press is confirmed, the process advances to step S208, and the start of an FA zoom operation is determined. On the other hand, in the automatic tracking mode, the process advances to step S204, and object designation processing is performed for an object to be tracked.

Note that in this embodiment, whether the mode is the manual search mode or the automatic tracking mode is determined based on the pressing time of the switch. The mode determination method, however, is not limited to this as long as the zoom operation switch is used. For example, when the zoom operation switch is pressed once, and then pressed again within a predetermined time, one of the modes may be determined. Alternatively, when the zoom operation switch and another member are simultaneously operated, one of the modes may be determined. Or, the present invention is not limited to the zoom operation switch of the pressing type, and a rotatable ring member or the like may be used instead to instruct an FA zoom operation.

Figure 8A:
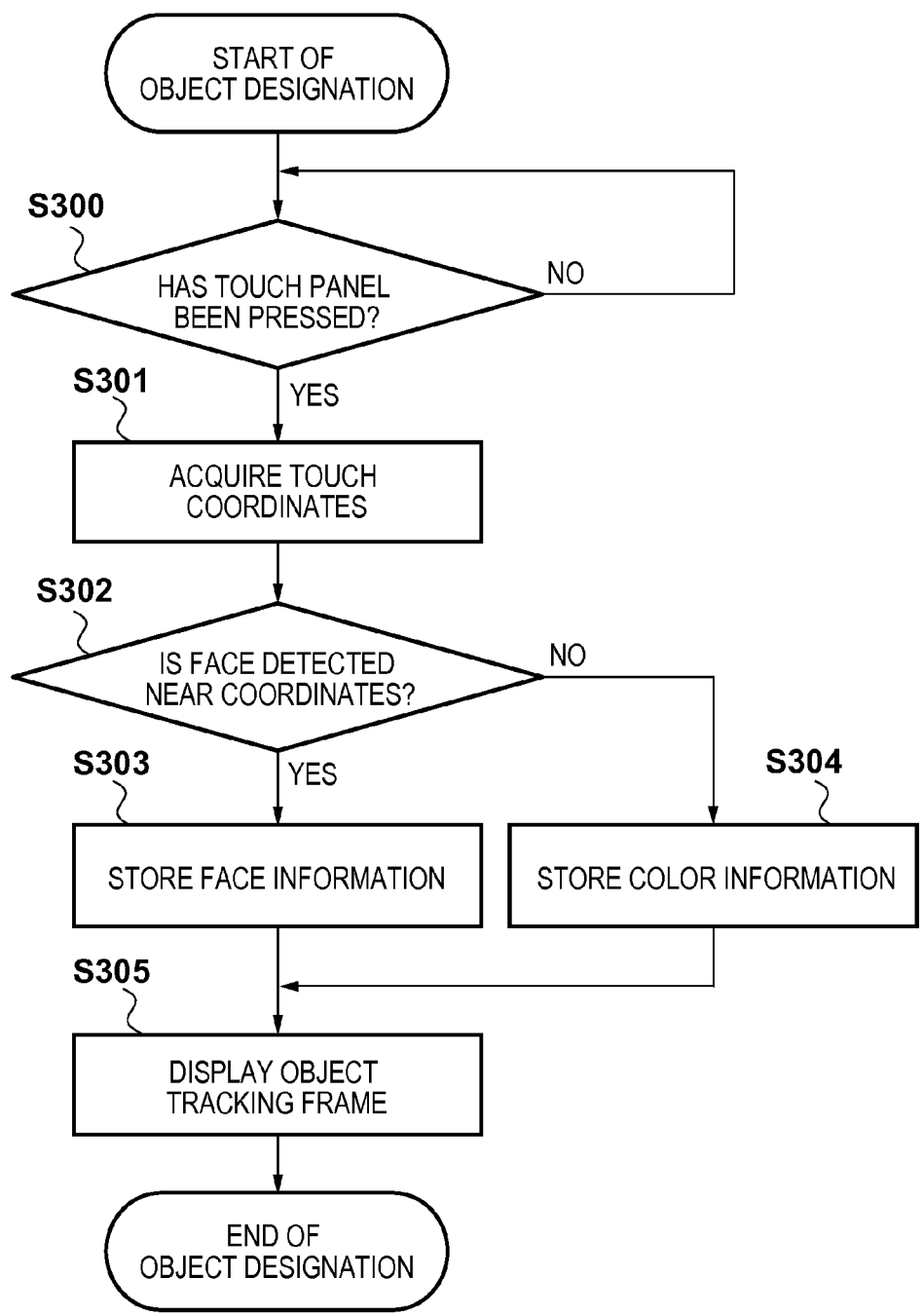
FIGS. 8A to 8C are flowcharts for explaining object designation processing.

The object designation processing in step S204 will be described with reference to FIGS. 8A to 8C. FIG. 8A is a flowchart illustrating an example of an operation of touching and designating the object displayed on the display unit 109 using a touch panel as a member of the operation unit 117. In step S300, it is determined whether the touch panel has been pressed. If the touch panel has been pressed, the process advances to step S301, and the FA zoom control unit 122 acquires a touch position.

In step S302, the FA zoom control unit 122 notifies the object detection unit 123 of the touch position, and the object detection unit 123 performs face detection near the touch position. If a face is detected near the touch position, the main object is determined as a person, and the process advances to step S303. In step S303, face information of the person as an automatic tracking target is stored in the memory 118. Detailed face information includes the size, detection position, and direction of the face upon designation of the object. A camera having a face authentication function also stores an authentication ID and the like.

If no face is detected near the touch position in step S302, the main object is determined as an article other than a person, and the process advances to step S304. In step S304, a feature color near the touch position is stored in the memory 118 as color information of an automatic tracking target. Detailed color information includes color, luminance, and color difference value of the feature color, and the size and barycentric position of an isochromatic area upon designation of the object. Note that the face information and color information will be collectively referred to as object information (object size/object detection position) in the following description.

After the object information is stored in step S303 or S304, the process advances to step S305. In step S305, an object tracking frame (article tracking frame 400 or face tracking frame 500) with a size corresponding to the object size is centered on the object detection position and displayed on the display unit 109, thereby terminating the object designation processing. Using the method shown in FIG. 8A described above enables the photographer to readily designate, by an intuitive designation method, an object to be tracked.

Figure 8B:
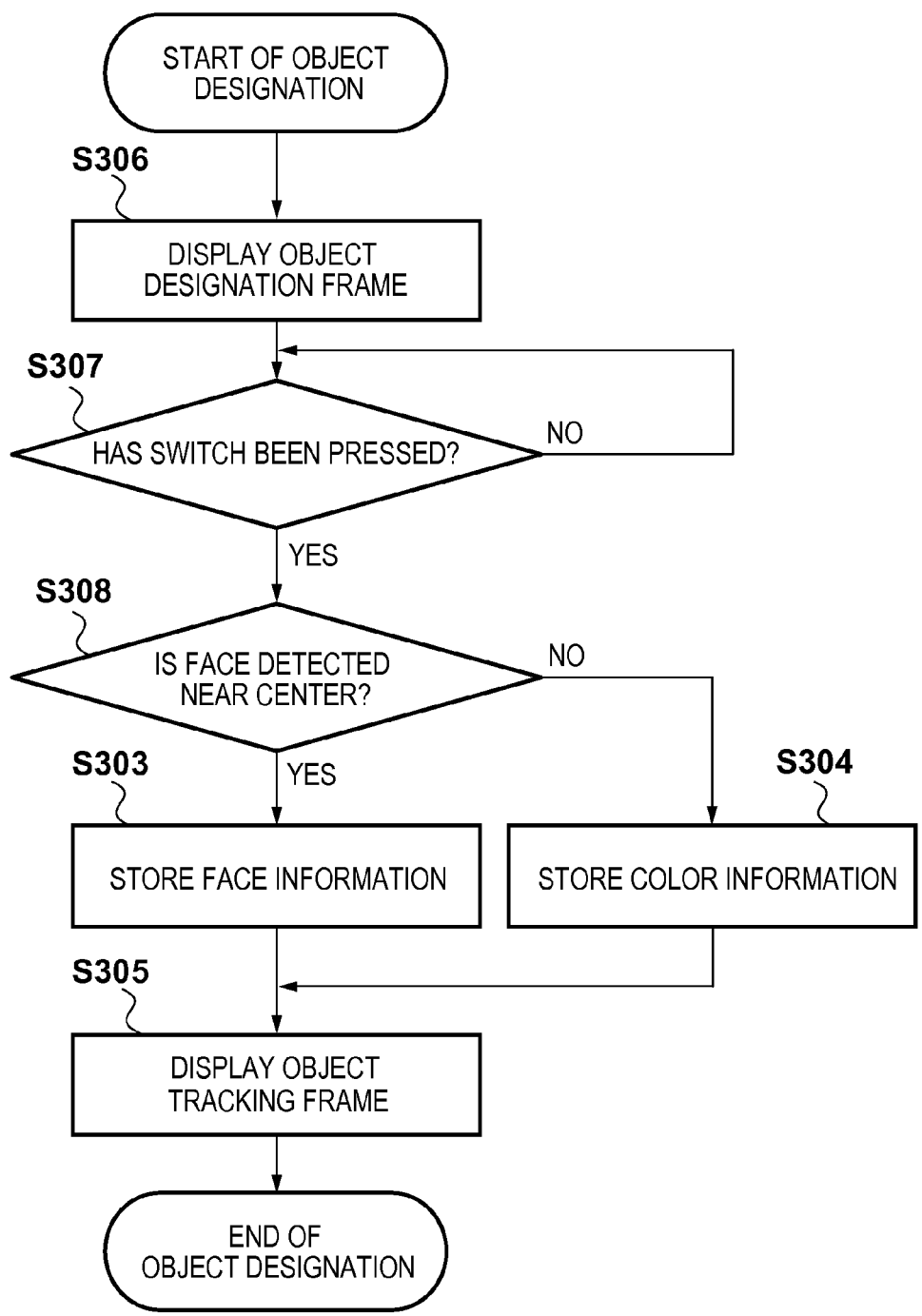

On the other hand, FIG. 8B is a flowchart illustrating an example of an operation of designating an object with a switch different from the FA zoom operation switch as a member of the operation unit 117. In step S306, the FA zoom control unit 122 displays a frame serving as an index for object designation near the center of the screen of the display unit 109. The photographer adjusts the orientation of the camera so that the object to be tracked falls within a central portion using the frame as an index. In step S307, it is determined whether the object designation switch has been pressed. If the object designation switch has been pressed, the process advances to step S308. In step S308, the object detection unit 123 performs face detection near the center of the screen. If a face is detected near the center of the screen, the main object is determined as a person, and the process advances to step S303. On the other hand, if no face is detected near the center of the screen, the main object is determined as an article other than a person, and the process advances to step S304. Furthermore, after object information is stored in step S303 or S304, similarly to FIG. 8A, the process advances to step S305, and an object tracking frame (article tracking frame 400 or face tracking frame 500) is displayed, thereby terminating the object designation processing.

The processing in steps S303 to S305 is the same as that in FIG. 8A except that an area where object detection is performed is a portion near the center of the screen, and a description thereof will be omitted. Using the method shown in FIG. 8B enables the photographer to readily designate an object even with a camera without an operation member like a touch panel.

Figure 8C:
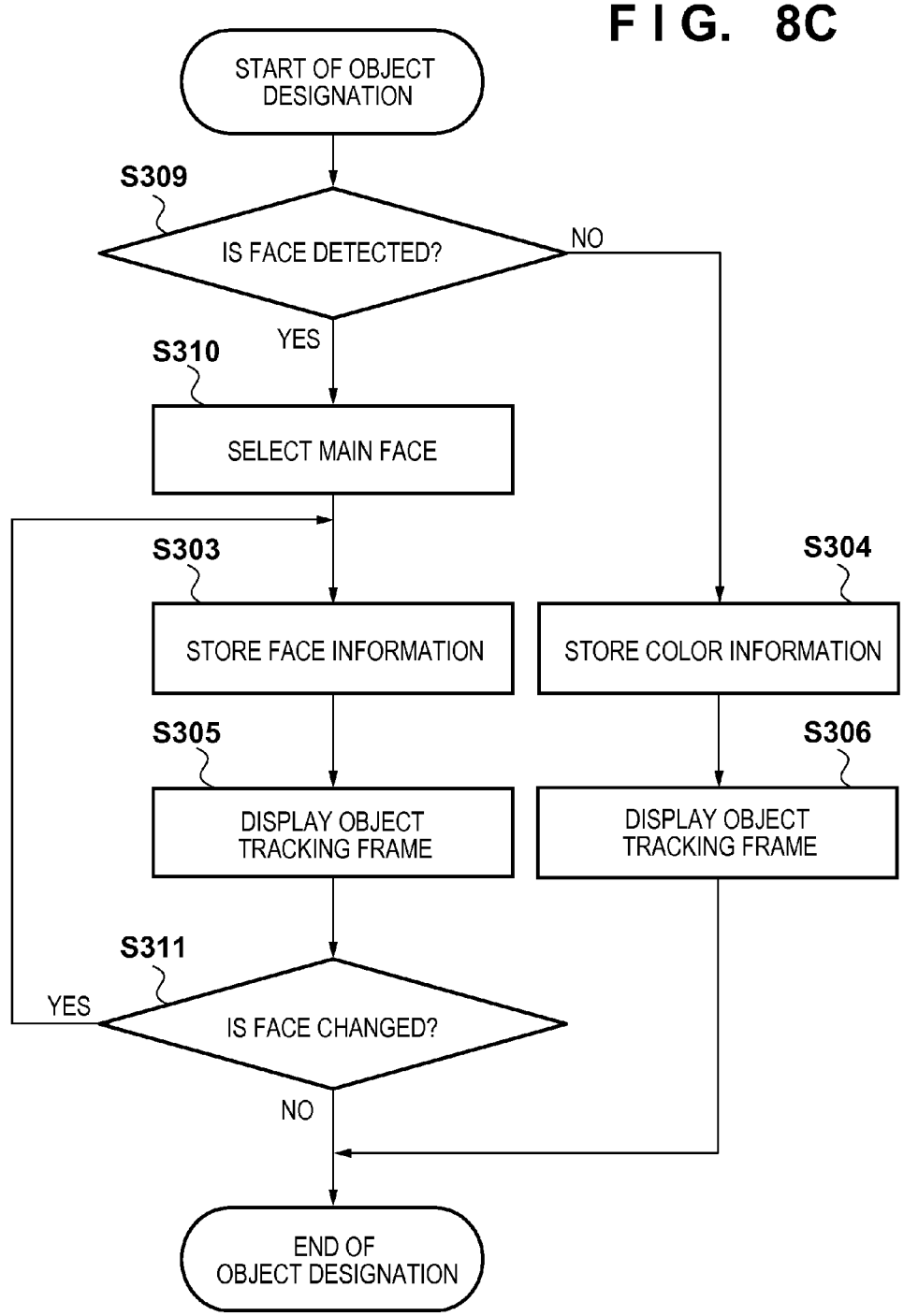

FIG. 8C is a flowchart illustrating a case in which an object to be tracked is automatically selected from detected faces when the FA zoom operation switch as a member of the operation unit 117 is pressed for a short time. In step S309, the object detection unit 123 performs face detection on the entire screen. If at least one person's face is detected on the entire screen, the main object is determined as a person, and the process advances to step S310.

If the number of detected faces is one, in step S310 the object detection unit 123 sets the face as a main face. If a plurality of faces are detected, a main face is selected from the faces as an object to be tracked. As main face selection determination criteria, for example, a face whose face detection position is closer to the center of the screen is selected as a main face. If the positions of faces are almost equally close to the center of the screen, a face with a larger size is selected as a main face. For a camera having a face authentication function, if there is a face registered for authentication, the face is preferably selected as a main face.

In step S303, face information of the selected main fame is stored in the memory 118. After the face information is stored in step S303, the process advances to step S305, and the face tracking frame 500 is displayed. If the main face automatically selected from the plurality of faces is not a face intended by the photographer, he/she can change the main face in step S311. In this case, upon pressing of the switch (which may be the FA zoom operation switch or another switch) of the operation unit 117, the main face is changed to a face which has not been selected as a main face from the detected faces, and the face tracking frame 500 is updated. If the main face has been changed, the process returns to step S303, and the stored face information is updated. Then, in step S305, the face tracking frame 500 is changed to correspond to the size and detection position of the newly selected main face.

If no face is detected on the entire screen in step S309, the main object is determined as an article other than a person, and the process advances to step S304. In step S304, a feature color near the center of the screen is stored in the memory 118 as color information of an automatic tracking target. After the color information is stored in step S304, the process advances to step S306, and the article tracking frame 400 is displayed, thereby terminating the object designation processing.

The processing in steps S303 to S306 is the same as that in FIG. 8A except that an area where object detection is performed is the entire screen for a face or a portion near the center of the screen for a color, and a description thereof will be omitted. Using the method shown in FIG. 8C enables the photographer to readily designate an object with a smaller number of operations.

Upon completion of the object designation processing, the process advances to step S205 in FIG. 7B. In steps S205 to S207, based on the reference object information designated in designating the object and periodically detected object information, it is determined whether to start an FA zoom operation. This determination processing is repeated every predetermined control period until the FA zoom start conditions are satisfied.

In step S205, the object detection unit 123 determines whether an object having the same feature as that indicated by the reference object information has been detected on the entire screen. That is, if the reference object is a person, the unit 123 determines whether a face has been detected. Or, if the reference object is an article, the unit 123 determines whether the same feature color has been detected. If no object to be tracked has been detected, the process advances to step S209; otherwise, the process advances to step S206. In step S206, it is determined whether the object tracking frame of the object to be tracked is included in the zoom-out area shown in FIG. 4A. If it is determined in step S206 that the tracking frame is included in the zoom-out area, that is, the object exists in the peripheral portion of the screen and may move out of the screen, the process advances to step S208 and the start of an FA zoom operation is determined. If it is determined in step S206 that the object tracking frame is not included in the zoom-out area, that is, the object is captured near the center of the screen, the process advances to step S207.

In step S207, the object size detected in step S205 is compared with the object size of the reference object information. If the object size detected in step S205 is equal to or larger than a predetermined multiple of the reference object size, the process advances to step S208, and the start of an FA zoom operation is determined. After the start of an FA zoom operation is determined in step S208, the process advances to step S101 of FIG. 6 to start a zoom-out operation.

On the other hand, if it is determined in step S205 that no object has been detected, the FA zoom control unit 122 determines in step S209 whether a predetermined time has elapsed. If the predetermined time has not elapsed, the FA zoom control unit 122 determines in step S210 whether the FA zoom operation switch has been pressed. Even if the object detected in step S205 is near the center of the screen and the object size is smaller than a predetermined multiple of the reference object size (NO in step S207), it is determined in step S210 whether the FA zoom operation switch has been pressed. If it is determined in step S210 that the FA zoom operation switch has not been pressed, the process returns to the object detection processing in step S205, and repeats the loop of steps S205, S209, and S210. If it is determined in step S209 that the predetermined time has elapsed while no object is detected, the process returns to step S204 to perform the object designation processing again. If it is determined in step S210 that the FA zoom operation switch has been pressed, the process advances to step S211.

In step S211, it is determined whether the FA zoom operation switch has been released within a predetermined time after pressing of the switch. If the FA zoom operation switch has been released within the predetermined time, it is considered that the automatic tracking mode has been cancelled, thereby terminating the FA zoom function. On the other hand, if the switch has not been released within the predetermined time, the process advances to step S202 to store the manual search mode. That is, in this embodiment, if the FA zoom operation switch has been pressed for the predetermined time or longer in the automatic tracking mode, the FA mode is changed to the manual search mode.

Figure 9A:
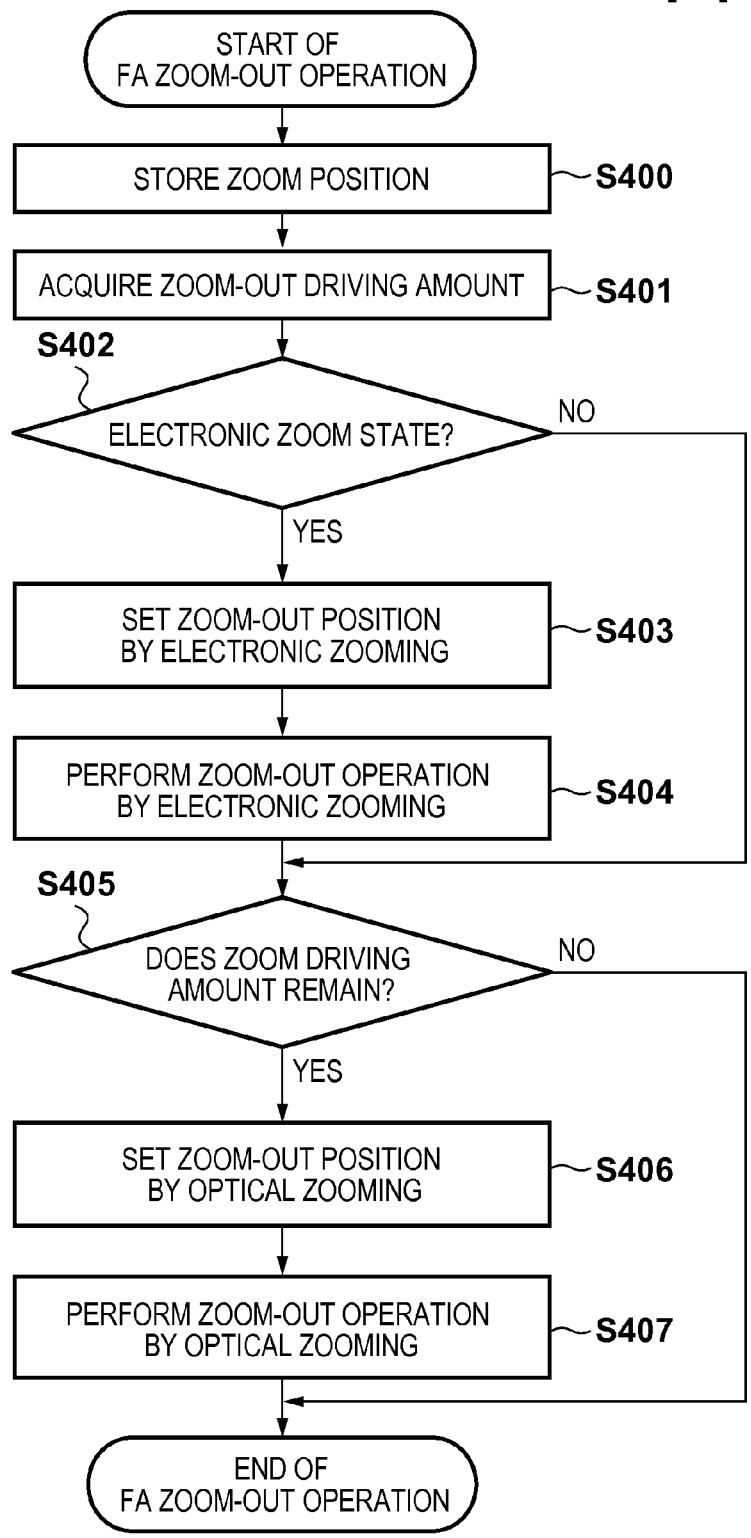
FIGS. 9A and 9B are flowcharts for explaining an FA zoom-out operation and an FA zoom-in operation, respectively.

FIG. 9A is a flowchart for explaining the processing of the FA zoom-out operation in step S101 of FIG. 6. In step S400, the FA zoom control unit 122 acquires an optical zoom position in the shooting preparation state from the CZ control unit 119, and acquires an electronic zoom position from the electronic zoom control unit 120. Furthermore, the FA zoom control unit 122 stores data of the optical zoom position and electronic zoom position in the memory 118. Note that the optical zoom position represents the position of the zoom lens corresponding to a zoom magnification changeable by the optical zoom function. The electronic zoom position represents a control position corresponding to an image enlargement/reduction magnification changeable by the electronic zoom function. In the manual search mode, the stored zoom position is set as a zoom return position.

In step S401, the FA zoom control unit 122 acquires a zoom-out driving amount stored in the memory 118. A zoom-out driving amount in the automatic tracking mode is set according to the size of the detected object. More specifically, as the size of the object is smaller, the zoom-out driving amount is set smaller. Note that in consideration of a smallest object detectable size, if the size of the object is smaller than a predetermined size, no zoom-out operation is performed. A zoom-out driving amount in the manual search mode may be changeable by an operation of the photographer through a setting menu. In step S402, the FA zoom control unit 122 determines whether the zoom state in the shooting preparation state is an electronic zoom state. In a general zoom operation, when the zoom operation switch of the operation unit 117 is pressed, if the optical zoom position is between the wide angle end and telephoto end, optical zooming is driven under the control of the CZ control unit 119. If the optical zoom position is at the telephoto end, and an operation in the telephoto direction is instructed, the electronic zoom control unit 120 drives electronic zooming to allow super-telephoto shooting. To ensure the consistency between an FA zoom operation and a zoom operation by the operation of the zoom operation switch, when the zoom state in the shooting preparation state is the electronic zoom state, electronic zooming is driven first also in the FA zoom operation. That is, it is determined whether the zoom position stored in the memory 118 falls within the zoom area in the zoom state to be prioritized. In this example, since electronic zooming is prioritized, it is determined in step S402 whether the zoom position falls within the electronic zoom area.

If the zoom state is the electronic zoom state upon start of the FA zoom operation, the process advances to step S403. In step S403, the FA zoom control unit 122 calculates a zoom-out position by electronic zooming based on the electronic zoom position acquired in step S400 and the zoom-out driving amount acquired in step S401, and sets the calculated zoom-out position in the electronic zoom control unit 120. In step S404, the FA zoom control unit 122 instructs the electronic zoom control unit 120 to perform zoom processing to the zoom-out position by electronic zooming, which has been set in step S403. The electronic zoom control unit 120 performs a zoom-out operation by electronic zooming.

If it is determined in step S402 that the zoom position in the shooting preparation state falls within the optical zoom area, or after a zoom-out operation by electronic zooming is performed in step S404, the process advances to step S405. In step S405, the FA zoom control unit 122 determines whether it is necessary to further perform a zoom-out operation by optical zooming. That is, if zoom driving by the set zoom-out driving amount is not obtained by only electronic zooming, it is necessary to compensate for the remaining zoom-out driving amount by optical zooming. If it is determined that it is necessary to perform a zoom-out operation by optical zooming, the process advances to step S406. In step S406, the FA zoom control unit 122 calculates a zoom-out position by optical zooming based on the optical zoom position and the zoom-out driving amount, and sets the calculated zoom-out position in the CZ control unit 119.

In step S407, the FA zoom control unit 122 instructs the CZ control unit 119 to perform zoom driving to the zoom-out position by optical zooming, which has been set in step S406. The CZ control unit 119 controls the zoom lens driving unit 113 to perform a zoom-out operation by optical zooming.

Upon completion of the above-described FA zoom-out operation, the process advances to step S102 of FIG. 6. In step S102, the FA zoom control unit 122 instructs the FA zoom frame control unit 121 to display the FA zoom frame 300 corresponding to a zoom return position. In the automatic tracking mode, a zoom position on the telephoto-side at a predetermined magnification with respect to the current angle of view is stored in the memory 118 as a zoom return position, and an angle of view corresponding to the zoom return position is displayed as an FA zoom frame. On the other hand, in the manual search mode, an angle of view corresponding to the zoom position upon start of the FA zoom-out operation, which has been stored in step S400 of FIG. 9A, is displayed as an FA zoom frame. After the FA zoom frame is displayed, the state is set to the object search state, and the process advances to the zoom return position change processing in step S103.

Figure 10:
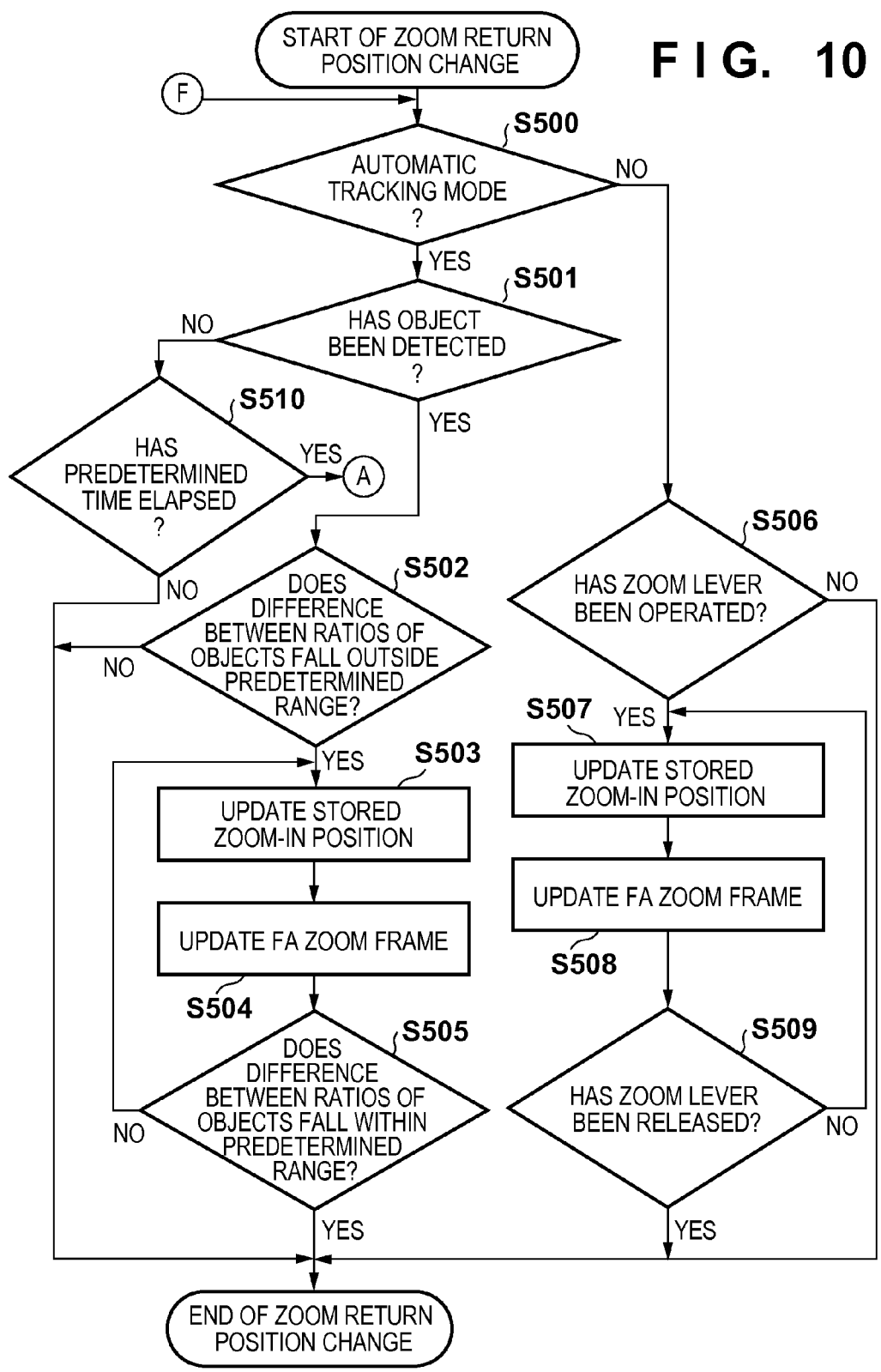
FIG. 10 is a flowchart for explaining zoom return position change processing.

FIG. 10 is a flowchart for explaining the zoom return position change processing in step S103 of FIG. 6. In step S500, it is determined whether the mode stored in step S202 or S203 in the FA zoom start determination processing shown in FIG. 7A is the automatic tracking mode or the manual search mode. If the stored mode is the manual search mode, the process advances to step S506. In the manual search mode, it is possible to change the zoom return position (third zoom position) stored in step S400 of FIG. 9A and the FA zoom frame 300 by an operation of a zoom lever by the photographer.

In step S506, it is determined whether the zoom lever of the operation unit 117 has been operated in the telephoto or wide angle direction. If the zoom lever has been operated, the process advances to step S507; otherwise, the process ends. In step S507, the zoom return position (zoom-in position) stored in the memory 118 in step S400 before the zoom-out operation is updated by a predetermined amount in the telephoto or wide angle direction in accordance with the operation direction determined in step S506. Then, the process advances to step S508. In step S508, display of the FA zoom frame 300 is updated to indicate an angle of view corresponding to the zoom return position updated in step S507, and the process advances to step S509.

In step S509, it is determined whether the zoom lever of the operation unit 117 has been released. If the zoom lever has not been released, the processing in steps S507 to S509 is repeated; otherwise, the process ends.

The above processing enables the photographer to change the zoom return position with a simple operation and more easily perform a framing operation even if the size of the object displayed on the display unit 109 changes after the zoom-out operation because, for example, the object moves closer.

If it is determined in step S500 that the mode is the automatic tracking mode, the process advances to step S501. In the automatic tracking mode, it is possible to automatically change the FA zoom frame 300 and the zoom return position (second zoom position) stored in the memory 118 based on the object size detected by the camera so that the object falls within an appropriate angle of view after a zoom-in operation.

Assume that the appropriate angle of view in this embodiment is such that the ratio of the object to the entire screen is almost the same as that of the reference object size designated in step S204 of FIG. 7A. In step S501, it is determined whether an object having face information or color information corresponding to the reference object information has been detected. If an object to be tracked has been detected, the process advances to step S502; otherwise, the process advances to step S510. In step S510, the FA zoom control unit 122 determines whether a predetermined time has elapsed while no object is detected. If the predetermined time has not elapsed, the process ends; otherwise, the process returns to step S204 of FIG. 7A to perform the object designation processing again.

In step S502, the ratio of the object detected in step S501 to the FA zoom frame 300, that is, the angle of view after the zoom-in operation is compared with the ratio of the reference object size to the entire screen. If the difference between the two ratios falls outside a predetermined range, the process advances to step S503; otherwise, the process ends. In step S503, the zoom return position stored in the memory 118 is changed. More specifically, if the object size detected in step S501 is larger than the reference object size, the zoom return position is updated by a predetermined amount in the wide angle direction. On the other hand, if the object size detected in step S501 is smaller than the reference object size, the zoom return position is updated by a predetermined amount in the telephoto direction. Then, the process advances to step S504.

In step S504, display of the FA zoom frame 300 is updated to indicate the same angle of view as that at the zoom return position updated in step S503, and the process advances to step S505. In step S505, it is determined whether the difference between the ratio of the reference object size to the entire screen and that of the object to the FA zoom frame 300 indicating the updated zoom return position falls within a predetermined range. Even after the zoom return position is updated by the predetermined amount, if the difference between the ratio of the object to the FA zoom frame 300 and that of the reference object falls outside the predetermined range, the processing in steps S503 to S505 is repeated to further change the zoom return position. If it is determined in step S505 that the difference between the ratio of the object to the FA zoom frame 300 and that of the reference object falls within the predetermined range, the process ends.

The above-described processing allows the camera to automatically change the zoom return position to more easily perform a framing operation even if the size of the object displayed on the display unit 109 changes after the FA zoom-out operation because, for example, the object moves closer.

FIG. 10 shows a case in which the zoom return position is changed by manually operating the zoom lever in the manual search mode, and the zoom return position is automatically changed according to the object size in the automatic tracking mode. However, the camera may be configured to allow an automatic change operation in the manual search mode and a manual change operation in the automatic tracking mode.

Figure 11:
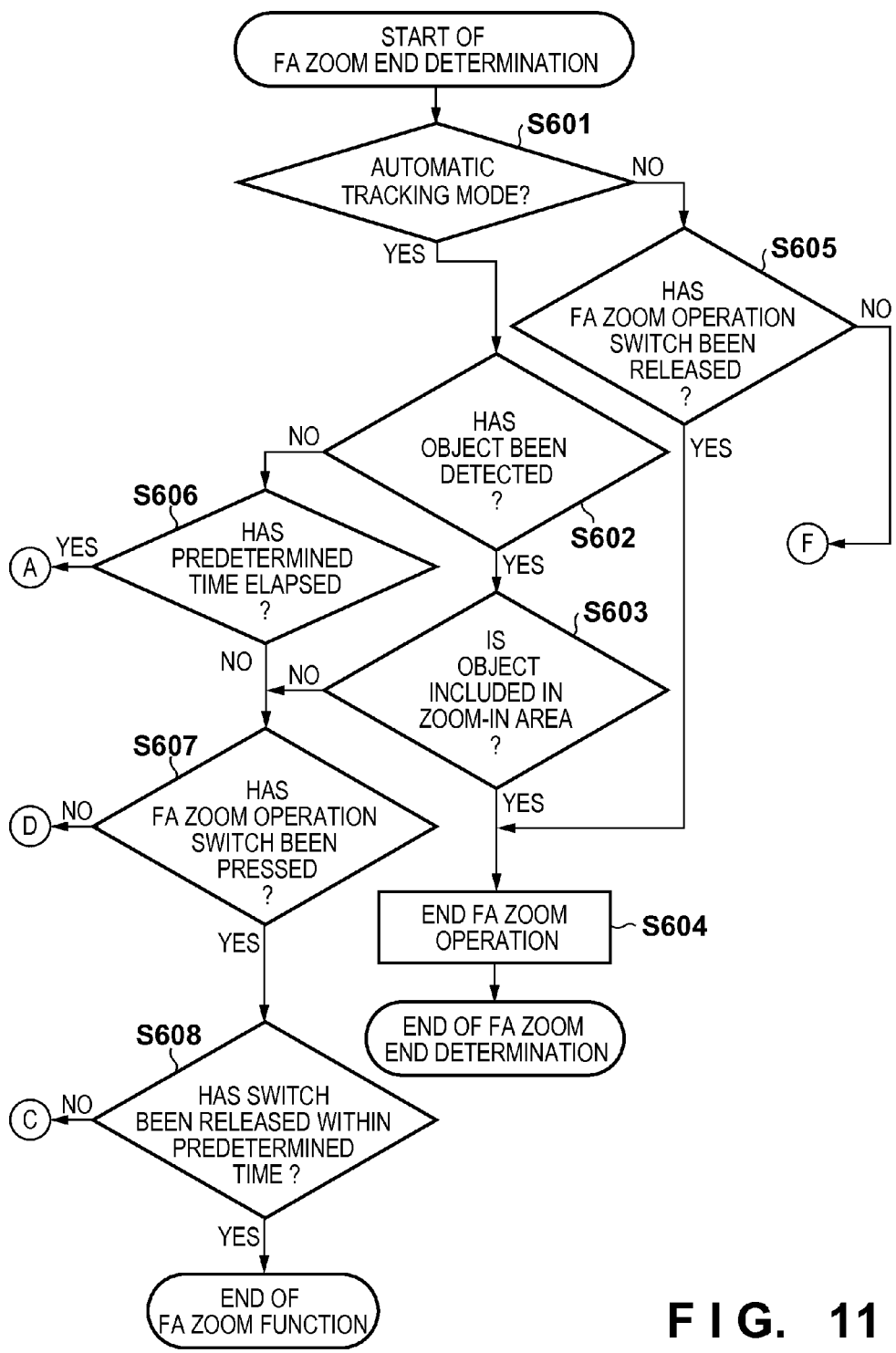
FIG. 11 is a flowchart for explaining FA zoom end determination processing.

FIG. 11 is a flowchart for explaining the FA zoom end determination processing in step S104 of FIG. 6. In step S601, it is determined whether the mode stored in step S202 or S203 in the FA zoom start determination processing shown in FIG. 7A is the automatic tracking mode or the manual search mode. If the mode is the manual search mode, the process advances to step S605. If the mode is the manual search mode, a pressed state continues during the object search state after pressing of the FA zoom operation switch is detected in step S200 or S210.

In step S605, it is determined whether the FA zoom operation switch has been released from a long pressed state. If the FA zoom operation switch has been released (a third operation), the process advances to step S604 to determine the end of the FA zoom operation. On the other hand, if it is determined in step S605 that the FA zoom operation switch has not been released, the object search state continues. Therefore, the process returns to step S500 of FIG. 10 to repeat the zoom return position change processing.

If it is determined in step S601 that the mode is the automatic tracking mode, the process advances to step S602. In step S602, it is determined whether an object having the same feature as that of the reference object information designated in step S204 of FIG. 7A has been detected. That is, if the reference object is a person, it is determined whether a face has been detected. Alternatively, if the reference object is an article, it is determined whether a corresponding color feature has been detected. If no object to be tracked has been detected, the process advances to step S606.

If it is determined in step S602 that an object to be tracked has been detected, the process advances to step S603. In step S603, it is determined whether an object tracking frame for the object to be tracked is included in the zoom-in area shown in FIG. 4B. If it is determined in step S603 that the tracking frame is included in the zoom-in area, that is, the object is captured near the center of the screen and has an object size in the angle of view at the zoom return position, the process advances to step S604 to determine the end of the FA zoom operation. After the end of the FA zoom operation is determined in step S604, the process advances to step S105 of FIG. 6 to start an FA zoom-in operation.

On the other hand, if it is determined in step S602 that no object has been detected, the FA zoom control unit 122 determines in step S606 whether a predetermined time has elapsed. If the predetermined time has not elapsed, the FA zoom control unit 122 determines in step S607 whether the FA zoom operation switch has been pressed. Furthermore, if it is determined that the object tracking frame of the object detected in step S602 is not included in the zoom-in area (NO in step S603), it is also determined in step S607 whether the FA zoom operation switch has been pressed. If it is determined in step S607 that the FA zoom operation switch has not been pressed, the process returns to step S500 of FIG. 10 to repeat the zoom return position change processing. If it is determined in step S606 that the predetermined time has elapsed while no object is detected, the process returns to step S204 of FIG. 7A to perform the object designation processing again. If it is determined in step S607 that the FA zoom operation switch has been pressed, the process advances to step S608.

In step S608, it is determined whether the FA zoom operation switch has been released within a predetermined time after pressing of the switch. If the FA zoom operation switch has been released within the predetermined time, it is considered that the automatic tracking mode has been cancelled, thereby terminating the FA zoom function. On the other hand, if the switch has not been released within the predetermined time, the process advances to step S202 of FIG. 7A to store the manual search mode. That is, in this embodiment, if the FA zoom operation switch is pressed for the predetermined time or longer in the automatic tracking mode, the FA mode is changed to the manual search mode.

Figure 9B:
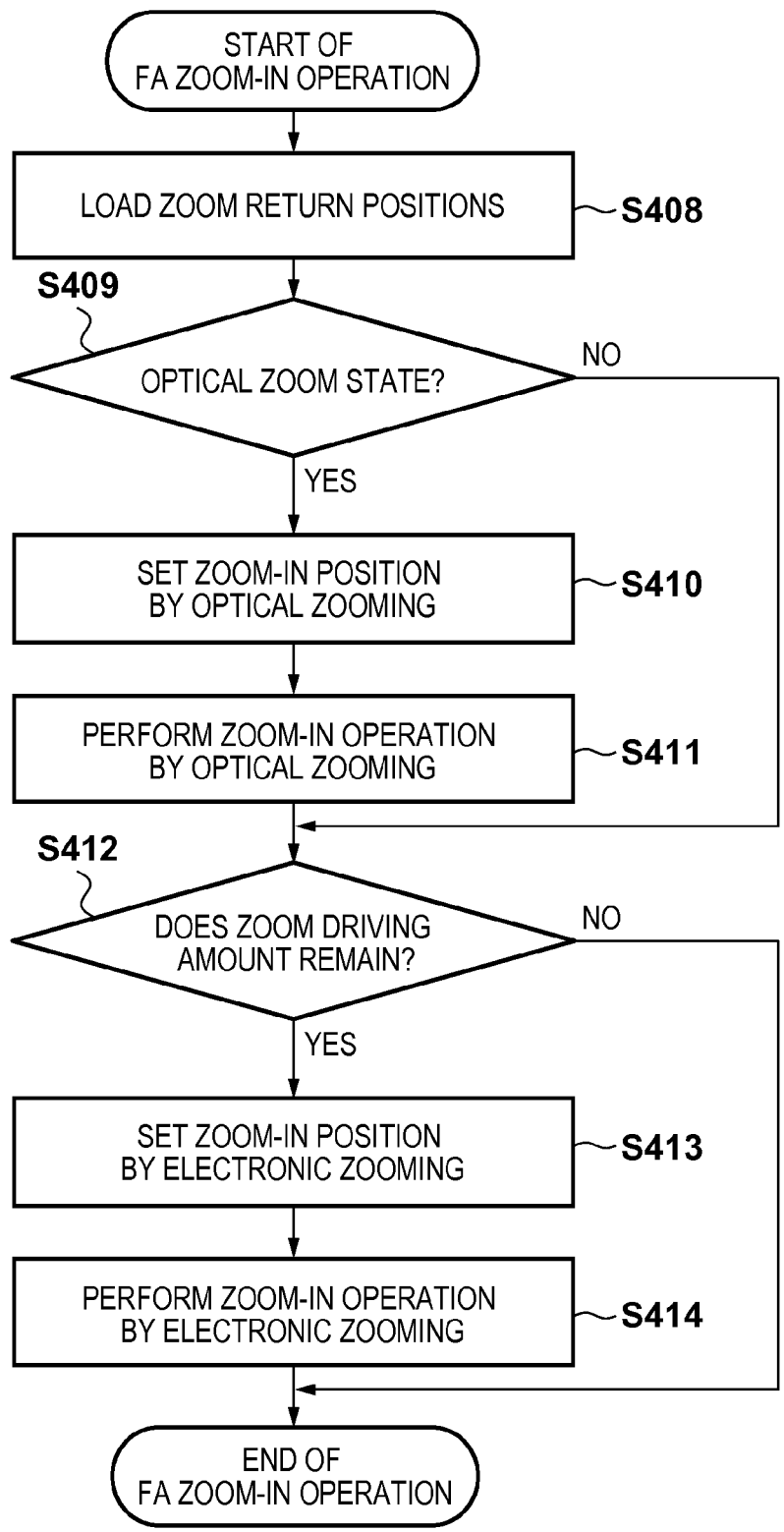

FIG. 9B is a flowchart for explaining the processing of the FA zoom-in operation in step S105. In step S408, the FA zoom control unit 122 loads data of the stored zoom positions (zoom return positions) from the memory 118. In step S409, the FA zoom control unit 122 determines whether the zoom state in the object search state is the optical zoom state. If the zoom state is the optical zoom state (YES in step S409), the process advances to step S410 to perform a zoom-in operation by prioritizing optical zooming. On the other hand, if the zoom state is the electronic zoom state (NO in step S409), the process advances to step S412 to perform a zoom-in operation by only electronic zooming.

In step S410, the FA zoom control unit 122 sets, among the zoom return positions 1 in step S408, the zoom-in position by optical zooming in the CZ control unit 119. In step S411, the FA zoom control unit 122 instructs the CZ control unit 119 to drive the zoom lens 102 to the zoom-in position by optical zooming, which has been set in step S410. The CZ control unit 119 controls the zoom lens driving unit 113 to perform a zoom-in operation by optical zooming.

If it is determined in step S409 that the zoom position in the object search state falls within the electronic zoom area, or after the zoom-in operation is performed by optical zooming in step S411, the process advances to step S412. In step S412, the FA zoom control unit 122 determines whether it is necessary to perform a zoom-in operation by electronic zooming. If it is necessary to perform a zoom-in operation by electronic zooming, the process advances to step S413; otherwise, the state is set to the shooting preparation state, thereby terminating the process.

In step S413, the FA zoom control unit 122 sets, among the zoom return positions read out in step S408, the zoom-in position by electronic zooming in the electronic zoom control unit 120. In step S414, the FA zoom control unit 122 instructs the electronic zoom control unit 120 to perform zoom processing to the zoom-in position by electronic zooming, which has been set in step S413. The electronic zoom control unit 120 performs an electronic zoom-in operation to return to the zoom return position. Upon completion of the operation, the state is set to the shooting preparation state, thereby terminating the process.

Other Embodiments

The objects of the present invention are also achieved as follows. That is, a storage medium storing a program code of a software program in which a procedure for implementing the functions of the above-described embodiment is described is supplied to a system or apparatus. The computer (or a CPU or MPU) of the system or apparatus reads out and executes the program code stored in the storage medium. In this case, the program code itself read out from the storage medium implements the new functions of the present invention, and the program and the storage medium storing the program code constitute the present invention.

Examples of the storage medium for supplying the program code are a flexible disk, hard disk, optical disk, and magnetooptical disk. Furthermore, a CD-ROM, CD-R, CD-RW, DVD-ROM, DVD-RAM, DVD-RW, DVD-R, magnetic tape, nonvolatile memory card, ROM, or the like can be used.

The functions of the above-described embodiment are implemented by enabling the computer to execute the readout program code. Also, the functions of the above-described embodiment are implemented when an OS (Operating System) or the like running on the computer performs some or all of actual processes based on the instructions of the program code.

Furthermore, the present invention includes a case in which, after the program code read out from the storage medium is written in the memory of a function expansion board inserted into the computer or the memory of a function expansion unit connected to the computer, the CPU of the function expansion board or function expansion unit performs some or all of actual processes based on the instructions of the program code.

The present invention is not limited to an apparatus such as a digital camera whose principal purpose is shooting, and is applicable to an arbitrary apparatus such as a mobile phone, a personal computer (for example, a laptop, desktop, or tablet computer) or a game device which incorporates an object detection apparatus or is externally connected to it. Therefore, the "object detection apparatus" in this specification intends to include an arbitrary electronic apparatus having an object detection function.

Although the preferred embodiments of the present invention have been described above, the present invention is not limited to them, and various modifications and changes can be made within the spirit and scope of the present invention. The present invention may be implemented not only during angle-of-view adjustment for still image shooting but also during angle-of-view adjustment in moving image recording.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-093046, filed Apr. 25, 2013, NO. 2013-138443, filed Jul. 1, 2013, and No. 2013-137668, filed Jul. 1, 2013, which are hereby incorporated by reference herein in their entirety.

What is claimed is:

1. An object detection apparatus including
a first operation unit configured to instruct to change an angle of view by a user,
an object detection unit configured to detect an object from an image, and
a control unit configured to control the angle of view in accordance with an operation via said first operation unit,
wherein in response to a first operation via said first operation unit, said control unit executes a first mode, and
in the first mode, if the object is detected by said object detection unit in a first area set within the image, said control unit changes the angle of view to a first angle of view on a wide angle-side, and sets the angle of view before the change as a second angle of view, and if, at the first angle of view, the object is detected by said object detection unit in a second area set within an area corresponding to the second angle of view, said control unit changes the angle of view to the second angle of view, wherein the second area is changed in accordance with the second angle of view.

2. The apparatus according to claim 1, wherein a ratio of a size of the first area to the image acquired before the change to the first angle of view is larger than a ratio of a size of the second area to the area corresponding to the second angle of view in the image acquired at the first angle of view.

3. The apparatus according to claim 1, wherein said control unit sets the first angle of view in accordance with a size of the object detected by said object detection unit.

4. The apparatus according to claim 1, wherein if a size of the object detected by said object detection unit is a first size, said control unit sets the first angle of view on a telephoto-side, as compared with a case in which the size of the object is a second size larger than the first size.

5. The apparatus according to claim 1, wherein in the first mode, if a size of the object detected by said object detection unit is smaller than a predetermined size, said control unit controls not to change the angle of view to the first angle of view.

6. The apparatus according to claim 1, wherein in the first mode, if a size of the object detected by said object detection unit changes to be not smaller than a predetermined multiple of the size, said control unit changes the angle of view to the first angle of view.

7. The apparatus according to claim 1, wherein at the first angle of view, said control unit changes to the second angle of view in accordance with a size of the object detected by said object detection unit.

8. The apparatus according to claim 1, wherein at the first angle of view, if a difference between a ratio of a size of the object to the image acquired at the first angle of view and a ratio of a reference size to the image acquired before the change to the first angle of view exceeds a predetermined amount, said control unit changes the stored second angle of view.

9. The apparatus according to claim 8, wherein the reference size is set based on the size of the object detected in response to the first operation.

10. The apparatus according to claim 7, wherein at the first angle of view, said control unit changes the second area in accordance with the change in the second angle of view.

11. The apparatus according to claim 1, further comprising a display unit configured to display an image,
wherein at the first angle of view, said control unit controls said display unit to superimpose and display a frame indicating the second angle of view on the image.

12. The apparatus according to claim 1, wherein
said control unit executes a second mode in response to a second operation, different from the first operation, via said first operation unit, and
in the second mode, said control unit changes the angle of view to a predetermined angle of view on the wide angle-side and sets a third angle of view in response to the second operation, and changes the angle of view to the third angle of view in response to a third operation via said first operation unit.

13. The apparatus according to claim 12, further comprising
a display unit configured to display an image,
wherein in the second mode, said control unit changes the angle of view to the predetermined angle of view on the wide angle-side in response to the second operation, and controls said display unit to superimpose and display a frame indicating the third angle of view on the image.

14. The apparatus according to claim 12, wherein based on an operation time of said first operation unit, said control unit determines whether the first operation or the second operation has been performed.

15. The apparatus according to claim 12, wherein the third angle of view is an angle of view before moving to the predetermined angle of view on the wide angle-side in response to the second operation.

16. The apparatus according to claim 12, further comprising
a second operation unit configured to instruct to change the angle of view by the user,
wherein if said second operation unit is operated before the third operation is performed for said first operation unit after the second operation is performed for said first operation unit, said control unit changes the third angle of view in response to the operation of said second operation unit.

17. The apparatus according to claim 1, wherein said object detection unit sets an object detected based on an area designated by the user as a detection target object in the first mode.

18. The apparatus according to claim 1, wherein said object detection unit sets an object detected in a predetermined area within the image as a detection target object in the first mode.

19. The apparatus according to claim 1, wherein if a plurality of objects are detected, said object detection unit selects a main object, and sets the main object as a detection target object in the first mode.

20. The apparatus according to claim 1, wherein the control unit controls a position of a zoom lens.

21. An image capturing apparatus comprising:
an image capturing unit configured to generate an image by photoelectrically converting light having passed through an imaging optical system; and
an object detection apparatus including:
a first operation unit configured to instruct to change an angle of view by a user,
an object detection unit configured to detect an object from an image, and
a control unit configured to control the angle of view in accordance with an operation via said first operation unit,
wherein in response to a first operation via said first operation unit, said control unit executes a first mode, and
in the first mode, if the object is detected by said object detection unit in a first area set within the image, said control unit changes the angle of view to a first angle of view on a wide angle-side, and sets the angle of view before the change as a second angle of view, and if, at the first angle of view, the object is detected by said object detection unit in a second area set within an area corresponding to the second angle of view, said control unit changes the angle of view to the second angle of view,
wherein the second area is changed in accordance with the second angle of view.

22. A method of controlling an object detection apparatus including a first operation unit configured to instruct to change an angle of view by a user, comprising:
a detection step of detecting an object from an image; and
a control step of controlling the angle of view in accordance with an operation via the first operation unit,
wherein in response to a first operation via the first operation unit, a first mode is executed in the control step, and
in the first mode, if the object is detected in the detection step in a first area set within the image, the angle of view is changed to a first angle of view on a wide angle-side and the angle of view before the change is set as a second angle of view, and if, at the first angle of view, the object is detected in the detection step in a second area set within an area corresponding to the second angle of view, the angle of view is changed to the second angle of view, wherein the second area is changed in accordance with the second angle of view.

23. The apparatus according to claim 1, wherein the control unit controls the angle of view by electronic zooming.

24. An object detection apparatus including:

a first operator controlled by a user;

a processor which executes the following:

detecting an operation to instruct to change an angle of view via said first operator, detecting an object from an image; and controlling the angle of view, by at least one of optical zooming and electronic zooming, in accordance with the operation via said first operator, wherein in response to a first operation via said first operator, said processor executes a first mode, and in the first mode, if the object is detected in a first area set within the image, said processor executes changing the angle of view to a first angle of view on a wide angle-side, and setting the angle of view before the change as a second angle of view, and if, at the first angle of view, the object is detected in a second area set within an area corresponding to the second angle of view, said processor executes changing the angle of view to the second angle of view, wherein the second area is changed in accordance with the second angle of view.

\* \* \* \* \*